US012804319B2

(12) United States Patent
Singhvi et al.

(10) Patent No.: US 12,804,319 B2
(45) Date of Patent: Nov. 17, 2026

(54) APPARATUSES AND METHODS INVOLVING TRANSDUCERS AND THEIR TUNING

(71) Applicant: The Board of Trustees of the Leland Stanford Junior University, Stanford, CA (US)

(72) Inventors: Ajay Singhvi, Stanford, CA (US); Aidan Fitzpatrick, Stanford, CA (US); Amin Arbabian, San Francisco, CA (US)

(73) Assignee: The Board of Trustees of The Leland Stanford Junior University, Stanford, CA (US)

( * ) Notice: Subject to any disclaimer, the term of this patent is extended or adjusted under 35 U.S.C. 154(b) by 86 days.

(21) Appl. No.: 18/728,419

(22) PCT Filed: Jan. 25, 2023

(86) PCT No.: PCT/US2023/011559

§ 371 (c)(1),
(2) Date: Jul. 11, 2024

(87) PCT Pub. No.: WO2023/146927

PCT Pub. Date: Aug. 3, 2023

(65) Prior Publication Data

US 2025/0088798 A1 Mar. 13, 2025

Related U.S. Application Data

(60) Provisional application No. 63/303,181, filed on Jan. 26, 2022.

(51) Int. Cl.
*H04R 3/04* (2006.01)
*B06B 1/02* (2006.01)
(Continued)

(52) U.S. Cl.
CPC ............ *H04R 3/04* (2013.01); *B06B 1/0207* (2013.01); *H04R 1/403* (2013.01); *H04R 3/12* (2013.01)

(58) Field of Classification Search
CPC ........... H04R 3/04; H04R 1/403; H04R 3/12; B06B 1/0207; B06B 1/0292; B06B 2201/51;
(Continued)

(56) References Cited

U.S. PATENT DOCUMENTS 7,670,290 B2 * 3/2010 Hossack ............... B06B 1/0292 310/309
10,585,178 B2 * 3/2020 Koudar ................ H10N 30/802

OTHER PUBLICATIONS

USPTO. International Search Report and Written Opinion (PCT ISR) dated Apr. 25, 2023, for parent PCT Application No. PCT/US2023/011559, 11 pages. Applicant also submitted a copy of the PCT ISR with the filing of the instant patent application.
(Continued)

*Primary Examiner* — Mark Fischer
(74) *Attorney, Agent, or Firm* — Mueting Raasch Group

(57) ABSTRACT

In certain examples, methods and circuit-based apparatuses involve or are directed to a transducer to be operated via at least one resonance frequency of the transducer, and to a tunable circuitry (e.g., negative capacitance control and/or resistance control) to change the resonance frequency and/or a bandwidth around the resonance frequency. In more specific aspects, a tunable negative capacitance control may be used to change the resonance frequency and/or damping resistance control without degrading a degree of sensitivity provided by the transducer. Another example, specific to a method, involves: operating a transducer, coupled to a negative capacitance, at a resonance frequency of the transducer; and changing or setting a characteristic concerning the resonance frequency by using a tunable circuit to effect
(Continued)

a change of the resonance frequency and/or a bandwidth around the resonance frequency.

20 Claims, 30 Drawing Sheets

(51) Int. Cl.
*H04R 1/40* (2006.01)
*H04R 3/12* (2006.01)
(58) Field of Classification Search
CPC ................ B06B 2201/55; G10K 15/04; G10K 2200/11; H03H 11/481; H03H 2009/02204; H04B 11/00
See application file for complete search history.

(56) References Cited

OTHER PUBLICATIONS

Chen, Y. Y., G. L. Huang, and C. T. Sun. "Band gap control in an active elastic metamaterial with negative capacitance piezoelectric shunting." Journal of Vibration and Acoustics 136.6 (2014): 061008.
Rezvanitabar, Ahmad, Evren F. Arkan, and F. Levent Degertekin. "Analysis of negative capacitance-based broadband impedance matching for CMUTs." IEEE transactions on ultrasonics, ferroelectrics, and frequency control 68.9 (2021): 3042-3052.
Maadi, Mohammad, Christopher Ceroici, and Roger J. Zemp. "Dual-frequency CMUT arrays for multiband ultrasound imaging applications." IEEE Transactions on Ultrasonics, Ferroelectrics, and Frequency Control 68.7 (2021): 2532-2542. (Abstract Only).
Ergun, Arif S., Goksen G. Yaralioglu, and Butrus T. Khuri-Yakub. "Capacitive micromachined ultrasonic transducers: Theory and technology." Journal of aerospace engineering 16.2 (2003): 76-84.
Lee, Jinseok, et al. "An ultra-high input impedance analog front end using self-calibrated positive feedback." IEEE Journal of Solid-State Circuits 53.8 (2018): 2252-2262. (Abstract Only).
Jiang, Hui, Zu-yao Chang, and Michiel AP Pertijs. "A 30 ppm< 80 nJ ring-down-based readout circuit for resonant sensors." IEEE Journal of Solid-State Circuits 51.1 (2015): 187-195.
Singhvi, Ajay, Aidan Fitzpatrick, and Amin Arbabian. "An Electronically Tunable Multi-Frequency Air-Coupled CMUT Receiver Array with sub-100μPa Minimum Detectable Pressure Achieving a 28kb/s Wireless Uplink Across a Water-Air Interface." 2022 IEEE International Solid-State Circuits Conference (ISSCC). vol. 65. IEEE, 2022. Applicant refers to Appendix B of the underlying U.S. provisional application.
Blackmon, Fletcher A., and Lynn T. Antonelli. "Experimental detection and reception performance for uplink underwater acoustic communication using a remote, in-air, acousto-optic sensor." IEEE Journal of oceanic Engineering 31.1 (2006): 179-187. (Abstract Only).
Tonolini, Francesco, and Fadel Adib. "Networking across boundaries: enabling wireless communication through the water-air interface." Proceedings of the 2018 conference of the ACM special interest group on data communication. 2018.
Ma, Bo, et al. "Wide Bandwidth and Low Driving Voltage Vented CMUTs for Airborne Applications." IEEE Transactions on Ultrasonics, Ferroelectrics, and Frequency Control 66.11 (2019): 1777.
Palumbo, Gaetano, and Domenico Pappalardo. "Charge pump circuits with only capacitive loads: Optimized design." IEEE Transactions on Circuits and Systems II: Express Briefs 53.2 (2006): 128-132. (Abstract Only).
Ismail, Yousr, et al. "A 34V charge pump in 65nm bulk CMOS technology." 2014 IEEE International Solid-State Circuits Conference Digest of Technical Papers (ISSCC). IEEE, 2014. (Abstract Only).
Kang, Eunchul, et al. "23.6 A 2pA/√ Hz transimpedance amplifier for miniature ultrasound probes with 36dB continuous-time gain compensation." 2020 IEEE International Solid-State Circuits Conference-(ISSCC). IEEE, 2020. (Abstract Only).
Bazes, Mel. "Two novel fully complementary self-biased CMOS differential amplifiers." IEEE Journal of Solid-State Circuits 26.2 (2002): 165-168. (Abstract Only).
Haller, Matthew I., and Butrus T. Khuri-Yakub. "A surface micromachined electrostatic ultrasonic air transducer." IEEE transactions on ultrasonics, ferroelectrics, and frequency control 43.1 (2002): 1-6.
Pekar, Martin, et al. "Frequency tuning of collapse-mode capacitive micromachined ultrasonic transducer." Ultrasonics 74 (2017): 144-152. (Abstract Only).
Seok, Chunkyun, et al. "A low-power wireless multichannel gas sensing system based on a capacitive micromachined ultrasonic transducer (CMUT) array." IEEE Internet of Things Journal 6.1 (2018): 831-843. (Abstract Only).
Liu, Sixing, et al. "Optimizing dual-piezoelectric-layer ultrasonic transducer via systematic analysis." Sensors and Actuators A: Physical 315 (2020): 112336.(Partial copy).

* cited by examiner

After correction - Aligned

Uniform 2D Array

Appreciable frequency shifts

>10x higher impedance at higher frequencies

Allows increasing CMUT bandwidth (BW) by using additional damping resistance

Negative Capacitance Tuning

Uniform, High-Sensitivity
Synthesized Wideband Response

APPARATUSES AND METHODS INVOLVING TRANSDUCERS AND THEIR TUNING

FEDERALLY-SPONSORED RESEARCH AND DEVELOPMENT

This invention was made with Government support under contract DE-AR0000825 awarded by the Advanced Research Projects Agency-Energy. The Government has certain rights in the invention.

BACKGROUND

Aspects of the present disclosure are related generally to the field of transducers, and as may be exemplified by uses in connection with, but not limited to, piezoelectric transducers, ultrasound transducers such as capacitive micromachined ultrasound transducers (CMUT) and piezoelectric micromachined ultrasound transducers (PMUT), and electrostatic transducers (among others) operating either in air-coupled or immersion transducer configurations for reception and transmission of acoustic waves.

Using acoustic transducer technology for ease of discussion, it has been appreciated that acoustic transducers, which convert free-space acoustic energy to received electrical signals or vice-versa, have a frequency response and noise characteristics that are dependent on geometric parameters fixed during the fabrication process. Many such transducers require precise fabrication processes, since minor variations in mechanical parameters can lead to changes in transducer properties such as transducer capacitance, resonance frequency, and bandwidth. Such process variations are especially problematic when designing large arrays involving transducer-based circuits, because a non-uniform response across array elements may directly impact the performance of the acoustic system. Further, process variations are also a significant issue when designing transducers that are highly sensitive and/or have a high quality ("high-Q") factor as in the case of high-Q sensors, and such variations may also appear over time due to ageing processes, drift or other considerations.

In efforts attempting to address these issues, transducer architectures have been disclosed as being fabricated with higher complexity so that they are sufficiently robust to such variations but at the expense of higher design and fabrication cost, time, and effort. Signal processing approaches that correct such non-idealities in the post-processing pipeline have also been disclosed but they are limited to imperfect compensation of these process variations.

One of many specific exemplary applications concerns immersion of transducer devices, for example, for communicating on the health of the world's water resources including the oceans which play a critical role in the ecosystem. The oceans regulate weather and global temperature, and they serve as the largest carbon sink and the greatest source of oxygen. Monitoring and maintaining ocean health is of paramount importance and has led to the emergence of the "Internet of Underwater Things (IoUT)" with intelligent sensors being deployed for aquaculture, environmental monitoring, surveillance, and exploration. Given that RF and optical signals are heavily attenuated in water, and ultrasound (US)—which has favorable propagation underwater—faces a large water-air interface loss (e.g., ~65 dB), deep underwater sensing nodes most often communicate data via ultrasonic links to surface buoys, which then use RF to relay data to a remote station. However, such relay-based water-to-air networking solutions are cost and infrastructure intensive, with the inflexibility of anchored buoys prohibiting operation at scale. Wireless, cross-medium communication approaches that do not require intermediary relays would enable large-scale deployment of next-generation IoUT sensors. Previously, laser Doppler vibrometers (LDV) [1] and mm-wave radars have been used to remotely detect displacements on the water surface caused by impinging US waves but suffer from poor sensitivity and low data rates.

Other issues arise in connection with resonant acoustic transducers. Like other resonant devices, acoustic transducers inherently tradeoff sensitivity for bandwidth. Resonant acoustic transducers experience this tradeoff between the transducer sensitivity and the transducer's bandwidth, which is typically fixed based on the geometric and material parameters. A highly sensitive transducer inherently has narrower bandwidth, while a wider bandwidth directly translates to lower sensitivity.

Many applications, however, necessitate having both high sensitivity and high bandwidth. One known way of achieving this is by designing transducer arrays that have elements operating at multiple discrete frequencies by having different fabricated geometries for different elements, such that the overall array response encompasses a wide frequency range without sacrificing sensitivity. However, the design and fabrication of such multi-frequency acoustic transducer arrays is especially complex and hence incurs higher design and fabrication cost, time, and effort. Moreover, the complex fabrication process also results in more challenges related to process variations. Such an approach that involves geometrically designed multi-frequency arrays does not feasibly scale to a large number of frequencies. This follows as the operating frequencies are fixed based on geometric design decisions and cannot be changed dynamically to meet various application requirements.

Other approaches for multi-frequency operation use the bias voltage as a tuning knob to alter transducer resonance frequency. However, this results in sub-optimal performance since the transducer is most efficient only at its optimal bias voltage that is determined by the transducer's mechanical properties.

SUMMARY OF VARIOUS ASPECTS AND EXAMPLES

Various examples/embodiments presented by the present disclosure are directed to issues such as those addressed above and/or others which may become apparent from the following disclosure. For example, in certain specific example embodiments, devices (and methods for use of such devices) according to the present disclosure involve exclusively electronic approaches for setting the sensitivity, resonance frequency, and/or bandwidth of acoustic transducers. Yet further certain specific example embodiments involve transducers that use or leverage electrical circuits such as negative capacitance and/or various types of electronically-based compensation circuits and use of such circuits to address resonance frequency, bandwidth and sensitivity aspects of the transducers.

In connection with certain specific examples, methods and circuit-based apparatuses involve or are directed to a transducer, coupled to negative capacitance, to be operated via at least one resonance frequency of the transducer, and to a tunable circuit (e.g., a negative capacitance control such as a variable capacitor and/or a circuit to permit selection of at least one of multiple capacitance circuits) to change the resonance frequency and in some instances with damping resistance to change a bandwidth around the resonance frequency. In more specific examples: a tunable negative capacitance control is used to change the resonance frequency; a tunable damping resistance is used to change a bandwidth around the resonance frequency; and both resonance frequency and bandwidth around the resonance frequency are tunable through use of a tunable negative capacitance control and a tunable damping resistance.

Building on the above-noted aspects, in certain other specific examples, the transducer may be biased towards an optimal bias voltage of the transducer and/or the tunable negative capacitance control may be used with other circuitry and/or may be operated to implement one or more specific features. As examples, the tunable negative capacitance control may interface with the transducer, and/or the tunable negative capacitance control may be implemented to mitigate or cancel parasitic capacitance.

In other specific examples, aspects of the present disclosure are directed to methods involving operating a transducer at a resonance frequency of the transducer, and changing or setting the resonance frequency by using a tunable negative capacitance control and/or changing or setting a bandwidth around the resonance frequency by using a tunable damping resistance. In yet more-specific examples, the methods may further include controlling an input of the tunable negative capacitance to change a bandwidth at the resonance frequency of the transducer.

The above discussion is not intended to describe each aspect, embodiment or every implementation of the present disclosure. The figures and detailed description that follow also exemplify various embodiments.

BRIEF DESCRIPTION OF FIGURES

Various example embodiments, including experimental examples, may be more completely understood in consideration of the following detailed description in connection with the accompanying drawings, each in accordance with the present disclosure, in which:

FIGS. 14A and 14B are graphs, in which FIG. 14A shows characteristics of a previously-known circuit without negative capacitance and FIG. 14B shows contrasting characteristics relating to use of an exemplary transducer-based circuit according to the present disclosure:

Figure 1:
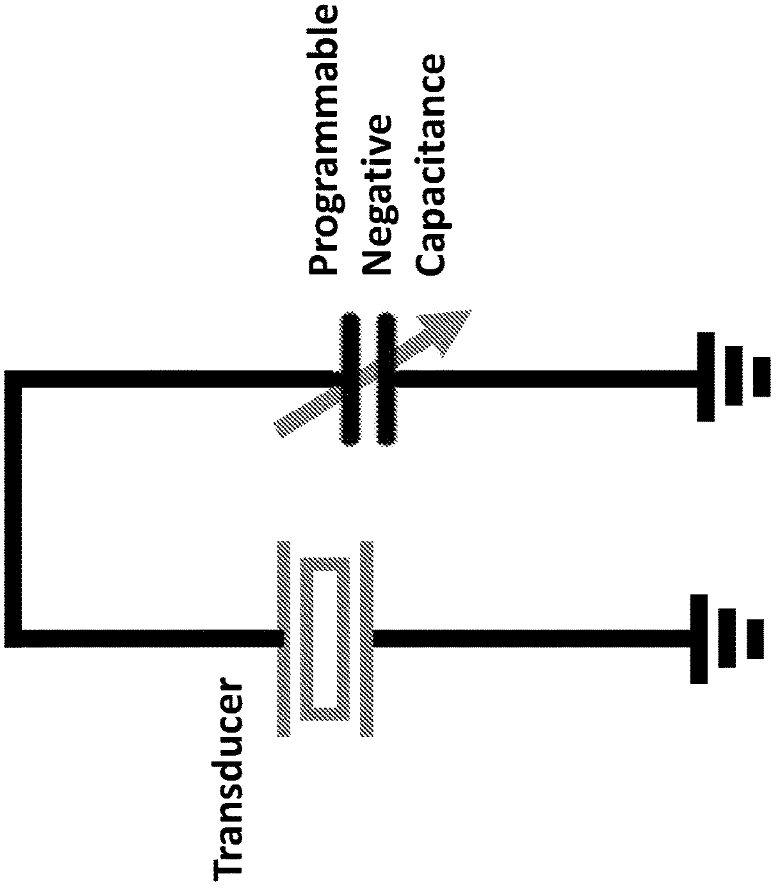
FIGS. 1 and 2 are alternative exemplary transducer-based circuits with tunable aspects according to the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a transducer to be operated via at least one resonance frequency of the transducer along with a tunable negative capacitance control to change or set the resonance frequency of a transducer and/or a tunable damping circuit to change or set a bandwidth around the resonance frequency. Further, in certain example contexts specific types of transducers (e.g., CMUTs, PMUTs) are discussed in the present disclosure to highlight certain application-specific aspects or benefits. While the present disclosure is not necessarily limited to such aspects, an understanding of specific examples in the following description may be understood from discussion in such specific contexts.

In certain specific example embodiments, aspects of the present disclosure are directed to circuit-based apparatuses, and/or methods of using such apparatus, that involve or are directed to a transducer to be coupled to a negative capacitance and operated via at least one resonance frequency of the transducer, and to changing or setting at least one of the resonance frequency by using a tunable negative capacitance control and a bandwidth around the resonance frequency by using a tunable damping resistance. The tunable negative capacitance control may refer to or include a variable capacitor and/or a circuit to permit selection of one or more of a plurality of different capacitance circuits. For a generalized view of exemplary types of individual negative capacitance transducer-based circuits consistent with aspects of the present disclosure, reference may be made to the examples below discussed in connection with exemplary transducer-based circuits illustrated in FIGS. 1, 2, 9, 10 and 11.

Relating to or building on the above aspects, certain other specific examples of the present disclosure are directed to biasing the transducer towards an optimal bias voltage of the transducer and/or the tunable negative capacitance control being used with other circuitry and/or may be operated to implement one or more specific features. As examples, the tunable negative capacitance control may interface with the transducer, and/or the tunable negative capacitance control may be implemented to mitigate or cancel parasitic capacitance In connection with certain other specific examples, methods and circuit-based apparatuses involve or are directed to a transducer to be operated via at least one resonance frequency of the transducer, a tunable negative capacitance control to change the resonance frequency, and an operational amplifier, wherein the tunable negative capacitance is created via a feedback path around the operational amplifier.

In more specific example embodiments, other circuitry may be included to provide specific functionally-related aspects. For example, a programmable damping resistance control may be included so as to drive an input of the operational amplifier, a stability detection loop (e.g., coupled to the tunable negative capacitance control) may be included for automatically providing a maximum allowable negative level of capacitance, and a resonance frequency estimation circuit (e.g., coupled to the tunable negative capacitance control) may be included for automatically providing a setting to the tunable negative capacitance control. In a further specific example embodiment, such additional circuitry may include or refer to a programmable damping resistance control to drive an input of the operational amplifier, and a resonance frequency and bandwidth estimation circuit, coupled to the tunable negative capacitance control, for automatically providing a setting to the tunable negative capacitance control and a setting to the programmable damping resistance control.

In connection with the above specific aspects (e.g., building on one or more of the above-characterized aspects), the tunable negative capacitance control: may change the resonance frequency without degrading a degree of sensitivity provided by the transducer and/or may change a bandwidth at the resonance frequency.

In connection with yet other specific aspects, the present disclosure is directed to or involves a transducer, as one of among an array of a plurality of transducers or transducer elements, to be operated via at least one resonance frequency of the transducer, and to a tunable negative capacitance control to change the resonance frequency, and optionally, one or more of the plurality of transducer elements is biased towards its optimal bias voltage.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same connotation and/or reference numerals may be used in different diagrams to refer to the same elements or additional instances of the same element. Also, although aspects and features (such as those characterized above) may in some cases be described in individual figures, it will be appreciated that aspects and features from one figure or example embodiment can be combined with aspects/features of another figure or example embodiment even though the combination is not explicitly shown or explicitly described as a combination. In connection with the above aspects, it will also be appreciated that such an apparatus or method may involve aspects/features presented and claimed in U.S. Provisional Application Ser. No. 63/303,181 filed on Jan. 26, 2022 (STFD.439P1 S21-457) with Appendices, to which priority is claimed. To the extent permitted, such subject matter is incorporated by reference in its entirety generally and to the extent that further aspects and examples (such as experimental and/more-detailed embodiments) may be useful to supplement and/or clarify.

In certain contexts, specific aspects of the present disclosure are directed to applications finding benefit from being able to use exclusively electronic approaches for tuning the sensitivity and bandwidth of acoustic transducers. In yet more more-specific contexts, these applications are benefited by not needing to provide such tuning of the sensitivity and bandwidth through the use of increasingly complex transducer geometries which seem to inherently involve high fabrication time, cost, and large process variations.

One type of specific example embodiment, according to specific aspects of the present disclosure, is directed to an approach involving remote US detection in air by using highly sensitive, air-coupled capacitive micromachined ultrasound transducer (CMUT) arrays to overcome the large water-air interface loss. CMUTs, like other MEMS sensors, have an inherent sensitivity-bandwidth tradeoff that directly impacts the SNR and data rates of US links. In one implementation, instead of increasingly complex CMUT architectures to provide a balance between sensitivity and bandwidth (which results in lower reliability and higher fabrication cost, time, and effort), electronic tuning knobs are exclusively used—for bias voltage and negative capacitance—to independently program the resonance frequency of each element in an array of identical, conventional vacuum CMUT elements that are easier to fabricate at scale. This approach allows for synthesizing a wideband response across the CMUT array without any drop in sensitivity, thereby overcoming the fundamental sensitivity-bandwidth barrier and demonstrating a noise equivalent pressure (NEP) that is more than a thousand times lower than state-of-the-art water-to-air US links, while still achieving a high data rate and perhaps including the highest rate demonstrated by acoustic water-to-air links (e.g., more than 20 kb/s, more than 25 kb/s, and more than 28 kb/s).

In other specific examples the present disclosure are directed to an apparatus or method of using the apparatus by: programmably changing or tuning multiple elements, to be used in an acoustic transducer and its interface circuit, to a single resonance frequency (e.g., without significant loss of sensitivity, while optimizing sensitivity, while realizing a relatively high synthesized bandwidth); and/or wherein changing or tuning the elements may be used to account for variations in the resonance frequency or, more specifically, variations in the resonance frequency as may be due, for example, to fabrication-related variations, ongoing-use of the elements and/or aging of the elements.

In yet another specific example, an apparatus or method of using the apparatus may be directed to: one or more elements in an acoustic transducer array and its circuit, and/or certain circuitry in the interface circuits for the acoustic transducer, wherein the one or more elements and/or certain circuitry may be programmably changed or tuned to set at least one resonance frequency; programmably changing or tuning a single acoustic transducer element and its interface circuit, sequentially, from a first resonance frequency to at least one additional resonance frequency (e.g., without significant loss of sensitivity, while optimizing sensitivity, and/or while realizing a relatively high bandwidth); and/or wherein changing or tuning the element may or may not be used to account for variations in the resonance frequency and/or variations in the resonance frequency due, as examples, to fabrication-related variations, ongoing-use of the elements and/or aging of the elements.

In certain specific contexts and implementations, certain aspects of the present disclosure are directed to use of certain manual controls, such as a knob or dial, for tuning the resonance frequency of an acoustic transducer. Advantages from these specific contexts are readily apparent from applications benefiting from allowing for multi-frequency operation without (some or any) degradation in sensitivity and thereby helping to alleviate the fundamental sensitivity versus bandwidth tradeoff that seems to be inherent in the designs of resonant MEMS sensors.

In yet further specific contexts, certain aspects of the present disclosure are directed to all-electronic approaches/circuitry which provides compensation for fabrication-related variations in resonance frequency, bandwidth, sensitivity and/or parasitic capacitance in multiple elements of a transducer and in some instances, across elements of a transducer array, across functionally-related elements operating as subset of all elements in the array, and/or selectively implementing two or more of these (e.g., by way of programming to compensate for resonance frequency variations ensuing from fabrication issues and/or from ongoing use of the transducers, and to adjust resonance frequency of the element(s) for functionally-related aspects or applications).

In applications and examples seeking to benefit from combinations of the above aspects and advantages, other specific aspects of the present disclosure are directed to uses and implementations of an easy-to-fabricate conventional acoustic transducer element as a single master design which may be manufactured and/or implemented for use either individually or in an array. Such aspects may also use completely electronic approaches to tune the transducer and system parameters and further, such tuning may be on the fly depending upon application requirements.

Consistent with the above exemplary aspects, another specific example embodiment of the present disclosure is directed to a programmable tuning circuit that includes a voltage-mode analog front-end, with a tunable negative capacitance and tunable resistance that interfaces with an acoustic transducer element which is biased close to its optimal bias voltage. Also, the tunable negative capacitance may be used to allow mitigation or cancellation of any parasitic capacitance as well as tune the parallel resonance frequency of the transducer. For example, as more of the transducer active capacitance is cancelled, the parallel resonance frequency of the transducer increases (while remaining just as sensitive as it was at its original optimal operation regime). Further, the tunable resistance allows for dampening the resonance, thereby lowering the transducer quality factor and increasing bandwidth.

Figure 2:
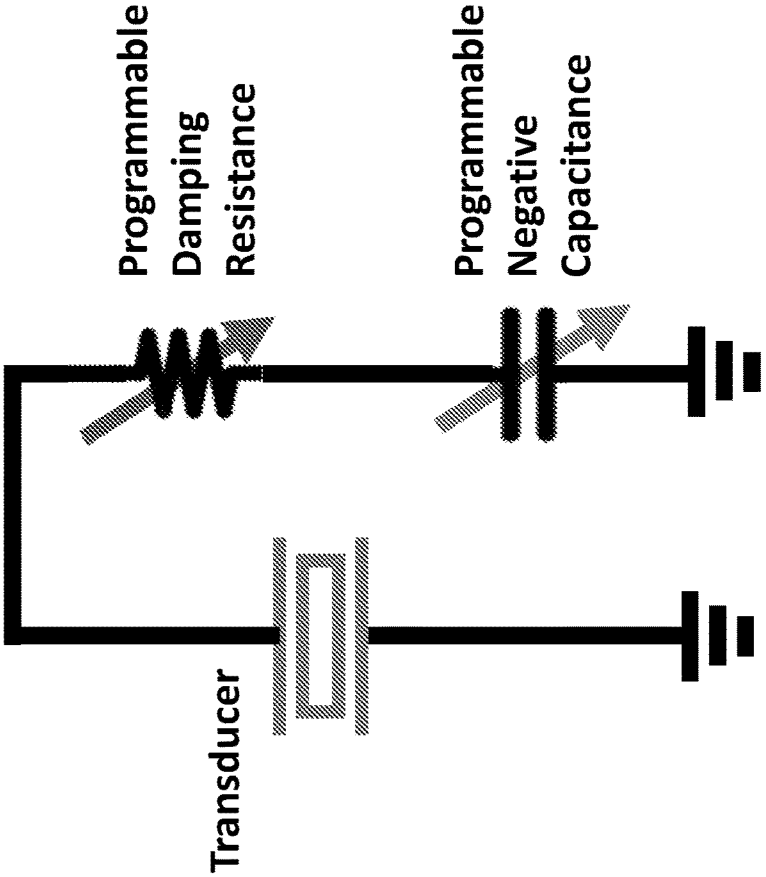

FIGS. 1 and 2 are alternative exemplary transducer-based circuits with tunable aspects, each according to the present disclosure. More particularly, each of FIGS. 1 and 2 depicts a transducer-based circuit including a transducer to be operated with negative capacitance and via at least one resonance frequency of the transducer, and further including tunable circuitry including at least one of a tunable negative capacitance control to change one or more of a resonance frequency of the transducer and damping resistance control to change a frequency bandwidth around the resonance frequency. FIG. 1 shows the tunable circuitry having a tunable (e.g., variable) negative capacitance control to effect a change of the resonance frequency and, whereas FIG. 2 shows the tunable circuitry having both a tunable negative capacitance control to change the resonance frequency and also having a damping resistance control to change a frequency bandwidth around the resonance frequency.

In connection with certain specific implementations consistent with the exemplary transducer-based circuits shown in FIGS. 1 and 2, aspects of the present disclosure are directed to operations and/or features specific to individual applications. Non-limiting examples applications in this regard include: tuning of the depth-resolution tradeoff in imaging applications by tuning the sensitivity-bandwidth with employing appropriate negative capacitance and damping resistance combinations: employing multi-frequency operation across elements in a transducer array to achieve both high sensitivity and a synthesized wide bandwidth (this can be used to simultaneously achieve both large depth and high resolution in imaging applications or both long range and high data-rate in communication applications; and employing such multi-frequency operation for a single element for interference mitigation. Other exemplary applications are discussed in various parts of Appendices A and B of the above-referenced US Provisional Application (e.g., including the slides in Appendix B under "exemplary-applications" subheadings or otherwise noted as being exemplary applications).

In connection with the above and certain other specific implementations consistent with the exemplary transducer-based circuits shown in FIGS. 1 and 2, aspects of the present disclosure may involve an acoustic transducer interface circuit and may further involve: programmably changing or tuning the resonance frequency of one or more such elements to be used in the acoustic transducer interface circuit, without significant loss of sensitivity, while optimizing sensitivity, and/or while realizing a high synthesized bandwidth enabling communication data rate or imaging resolution much higher than would be realizable with a conventional transducer and without the presented tuning mechanism.

For example, in connection with certain experimental examples and/or proof-of-concept embodiments, such an apparatus employs a synthesized bandwidth from 1 kHz-100 MHz, to accommodate a wide variety of possible applications, and for certain specific exemplary applications, such data rate and imaging resolution ranges may be, respectively: (a) 1 kbits/second-10 Mbits/second data rate and 10 μm-100 cm imaging resolution, for an application involving acoustic reception in air, and (b) 1 kbits/second-100 Mbits/second and 1 μm-100 cm for an application involving acoustic reception in immersion); and/or providing one or more elements in the acoustic transducer array and its interface circuit to be synthesized (e.g., as so programmed) to provide a certain frequency response (e.g., a wideband response, a single-frequency response, and/or one or more responses associated with selected frequencies or frequency ranges) during operation of the acoustic transducer.

Figure 3A:
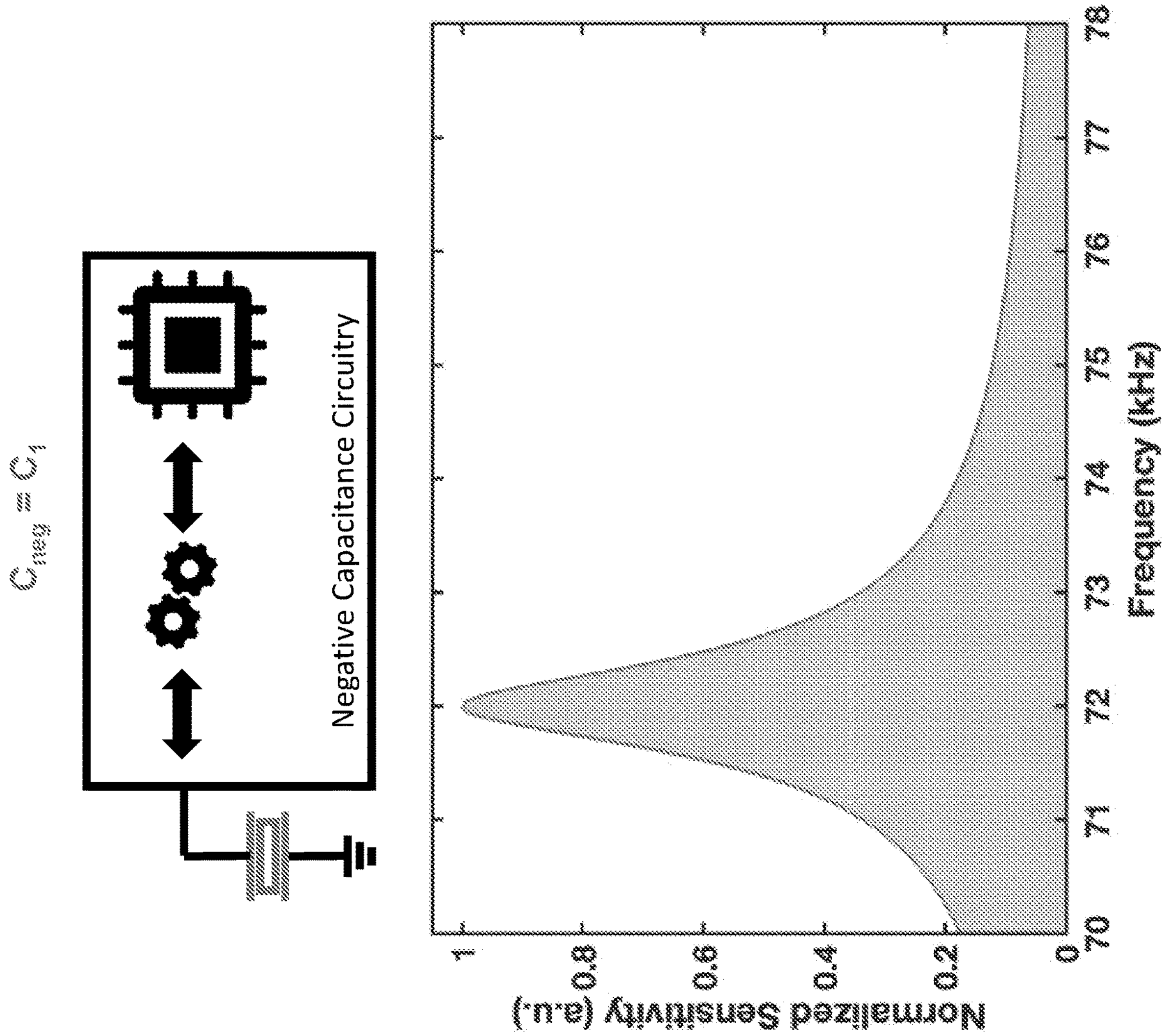
FIGS. 3A, 3B and 3C are three respective illustrations showing exemplary effects of varying amounts of negative capacitance to change a resonance frequency ($f_{res}$) of a transducer-based circuit, according to the present disclosure.
Figure 3B:
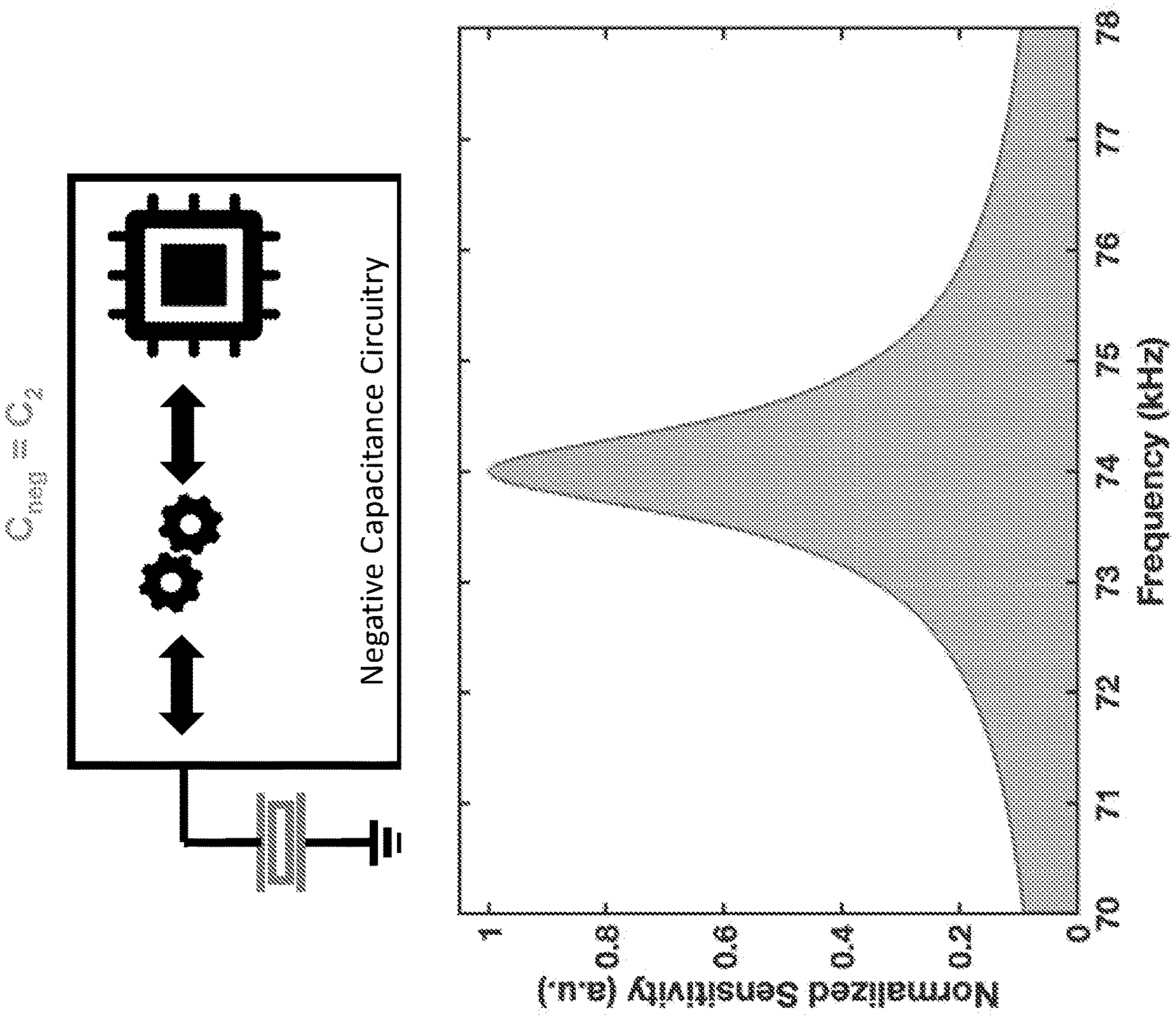
Figure 3C:
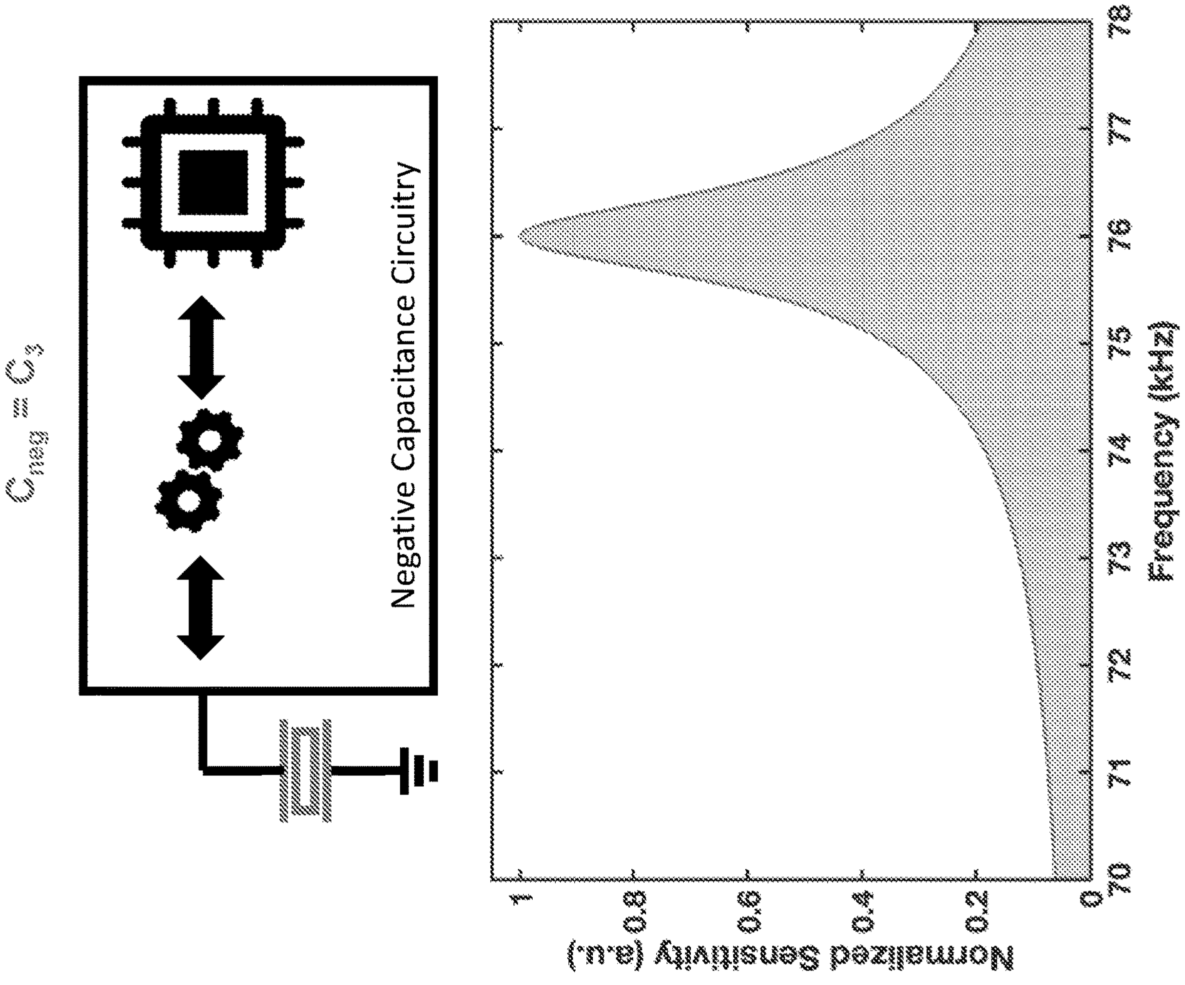

Consistent with the example of FIG. 1 as discussed above, FIGS. 3A, 3B and 3C are three respective illustrations which collectively show, for a transducer-based circuit and according to the present disclosure, how controlling the effective amount of negative capacitance in a common negative capacitance circuit, the resonance frequency of the transducer-based circuit can be set, tuned and/or controlled. The upper portion of each of FIGS. 3A, 3B and 3C shows a transducer-based circuit having similarly-appearing negative capacitance circuit and with a normalized-sensitivity versus resonance-frequency graph underneath. The first of the similarly-appearing negative capacitance circuitries, for FIG. 3A, corresponds to a negative capacitance circuit wherein the negative capacitance ($C_{neg}$) is set at a first negative capacitance level ($C_1$), and for which FIG. 3A shows a plot of the resonance frequency peaking at about 72 kHz. For FIG. 3B, the second circuit corresponds to a negative capacitance circuit wherein the negative capacitance ($C_{neg}$) is set at a second negative capacitance level ($C_2$), and for which FIG. 3B shows a plot of the resonance frequency peaking at about 74 kHz. For FIG. 3C, the third circuit corresponds to a negative capacitance circuit wherein the negative capacitance ($C_{neg}$) is set at a third negative capacitance level ($C_3$), and for which the plot has the resonance frequency peaking at about 76 kHz. In this manner and as depicted in FIG. 1, the resonance frequency of the transducer-based circuit is set and/or programmably controlled, for example, by increasing the amount of negative capacitance to realize an increased $f_{res}$ for the transducer circuit.

Figure 4A:
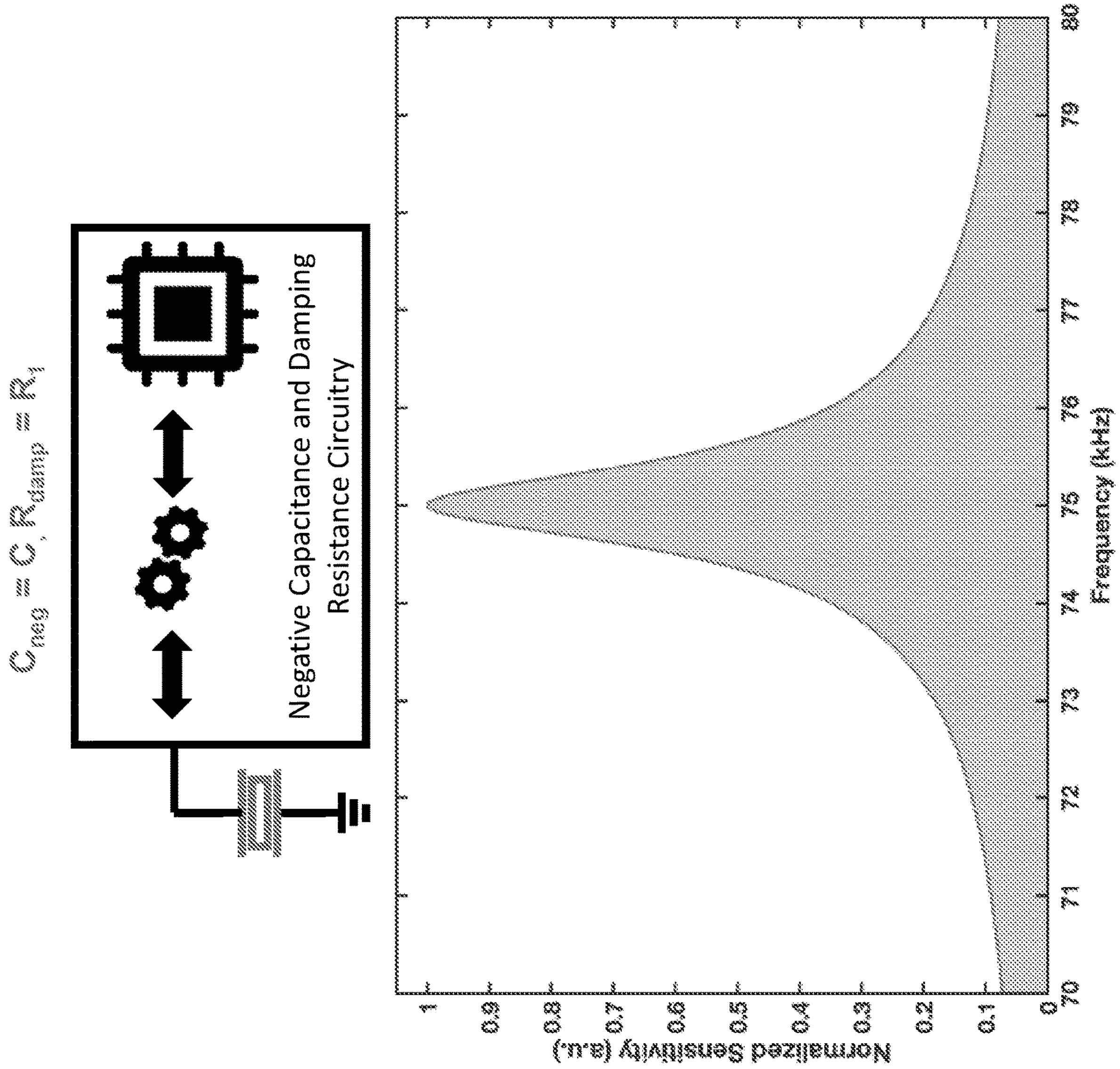
FIGS. 4A, 4B and 4C are three respective illustrations showing exemplary effects of varying amounts of damping resistance to change the transducer bandwidth at a $f_{res}$ of a transducer-based circuit, according to the present disclosure.
Figure 4B:
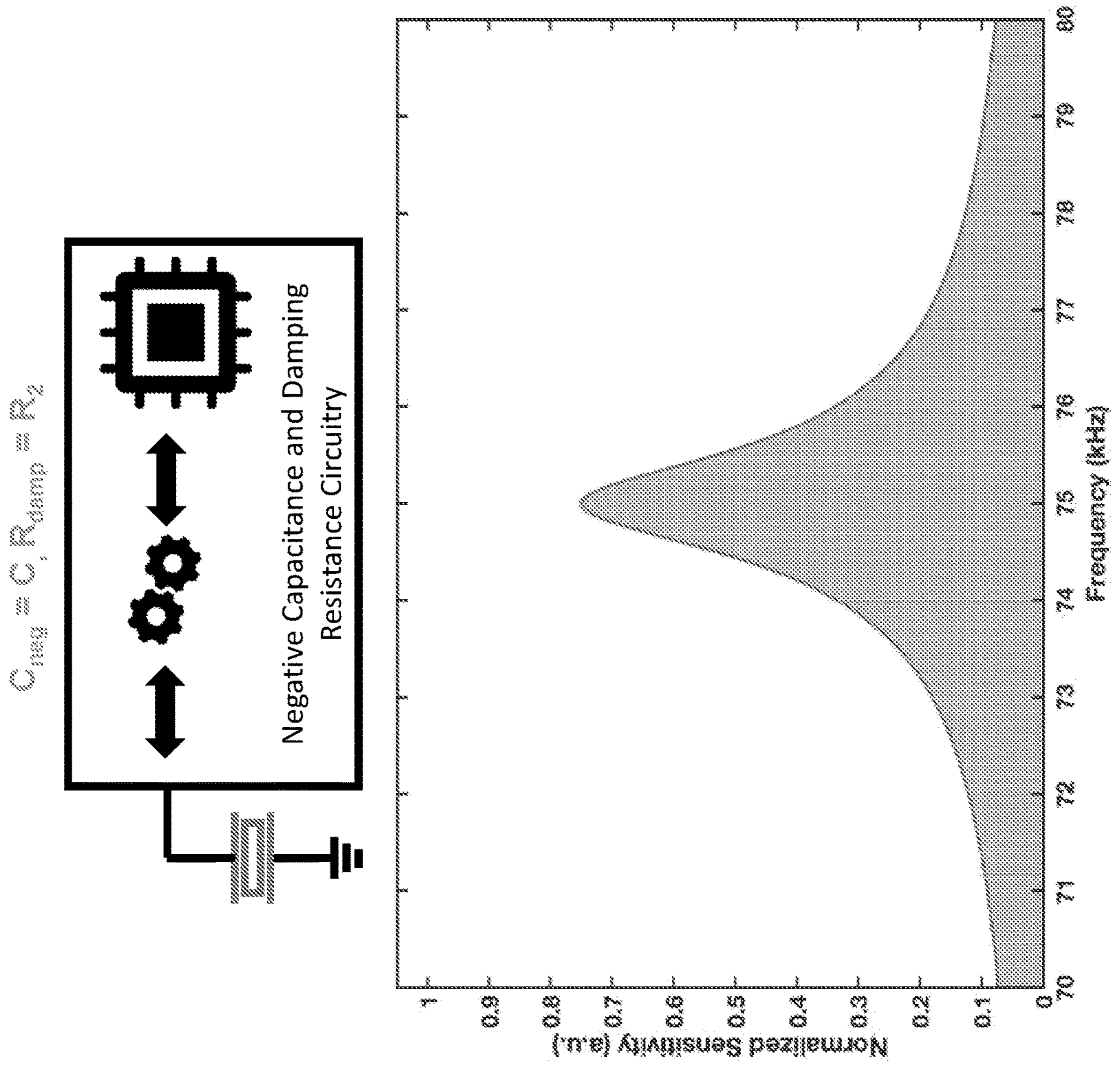
Figure 4C:
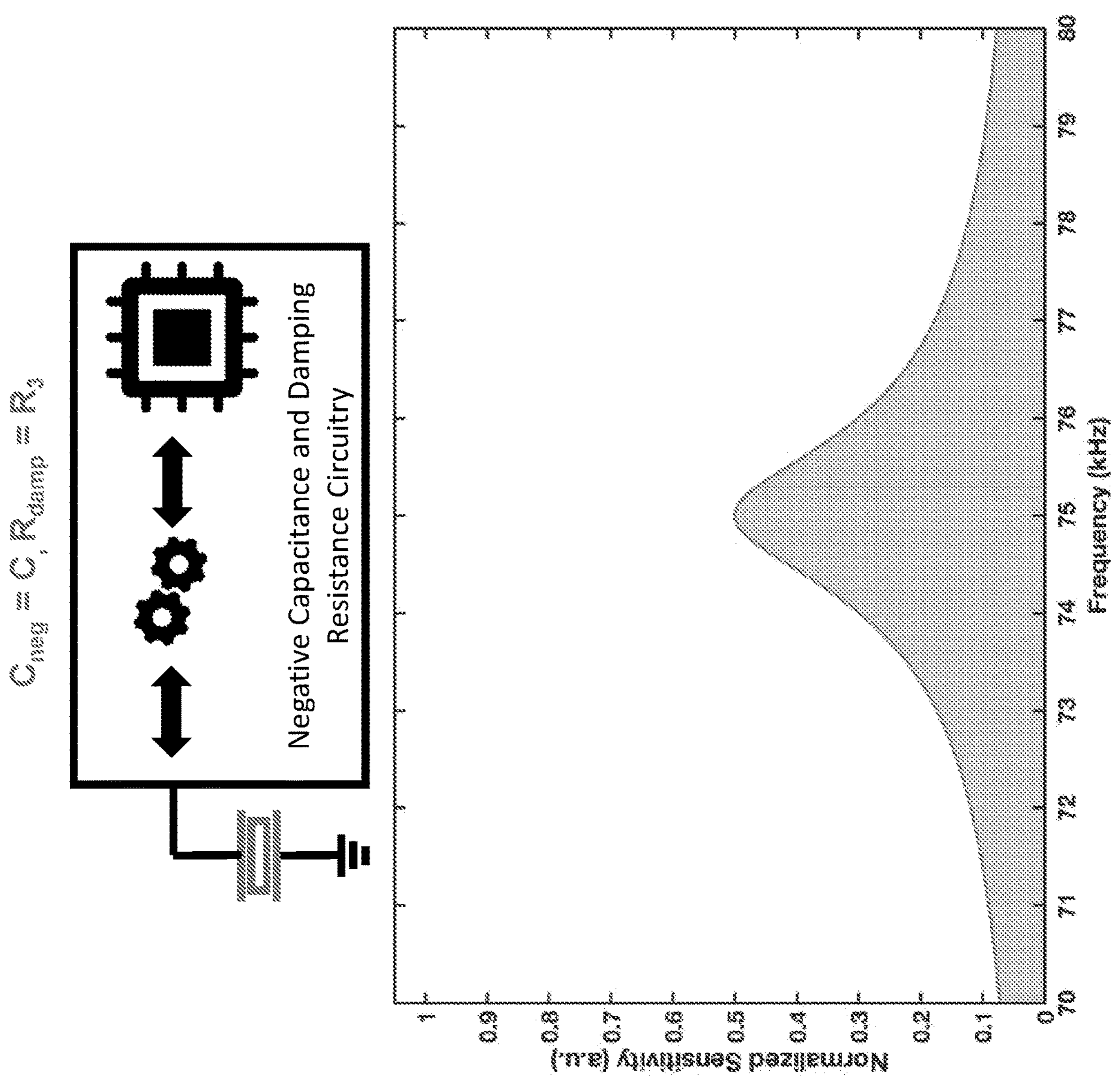

Consistent with the above example of FIG. 2 but assuming a constant negative capacitance, FIGS. 4A, 4B and 4C are three respective illustrations which collectively show; for a transducer-based circuit and according to the present disclosure, how controlling the effective amount of damping resistance in a common negative capacitance circuit (with the negative capacitance of each being set at an equal amount and the resonance frequency peaking at about 75 kHz for each such circuit), the bandwidth of the transducer-based circuit can be set, tuned and/or controlled. The upper portion of each of FIGS. 4A, 4B and 4C shows a transducer-based circuit having similarly-appearing negative capacitance circuit and with a normalized-sensitivity versus resonance-frequency graph underneath. The first of the similarly-appearing negative capacitance circuitries, as in FIG. 4A, corresponds to the negative capacitance circuit wherein the damping resistance is set at a first level ($R_{damp}=R_1$), and for which FIG. 4A shows a plot of the resonance frequency with a relatively narrow bandwidth as set by the damping resistance. For FIG. 4B, the second circuit corresponds to a damping resistance set by an higher resistance value ($R_{damp}=R_2$), and for which FIG. 4B shows a plot of the resonance frequency with a relatively wider bandwidth. For FIG. 4C, the third circuit corresponds to a damping resistance set by an even higher resistance value ($R_{damp}=R_3$), and for which FIG. 4C shows a plot of the resonance frequency with the widest bandwidth among the three plots. In this manner, the damping resistance of the transducer-based circuit is set and/or programmably controlled, for example, by increasing or decreasing the amount of damping resistance to realize an increased or decreased transducer bandwidth.

Figure 5A:
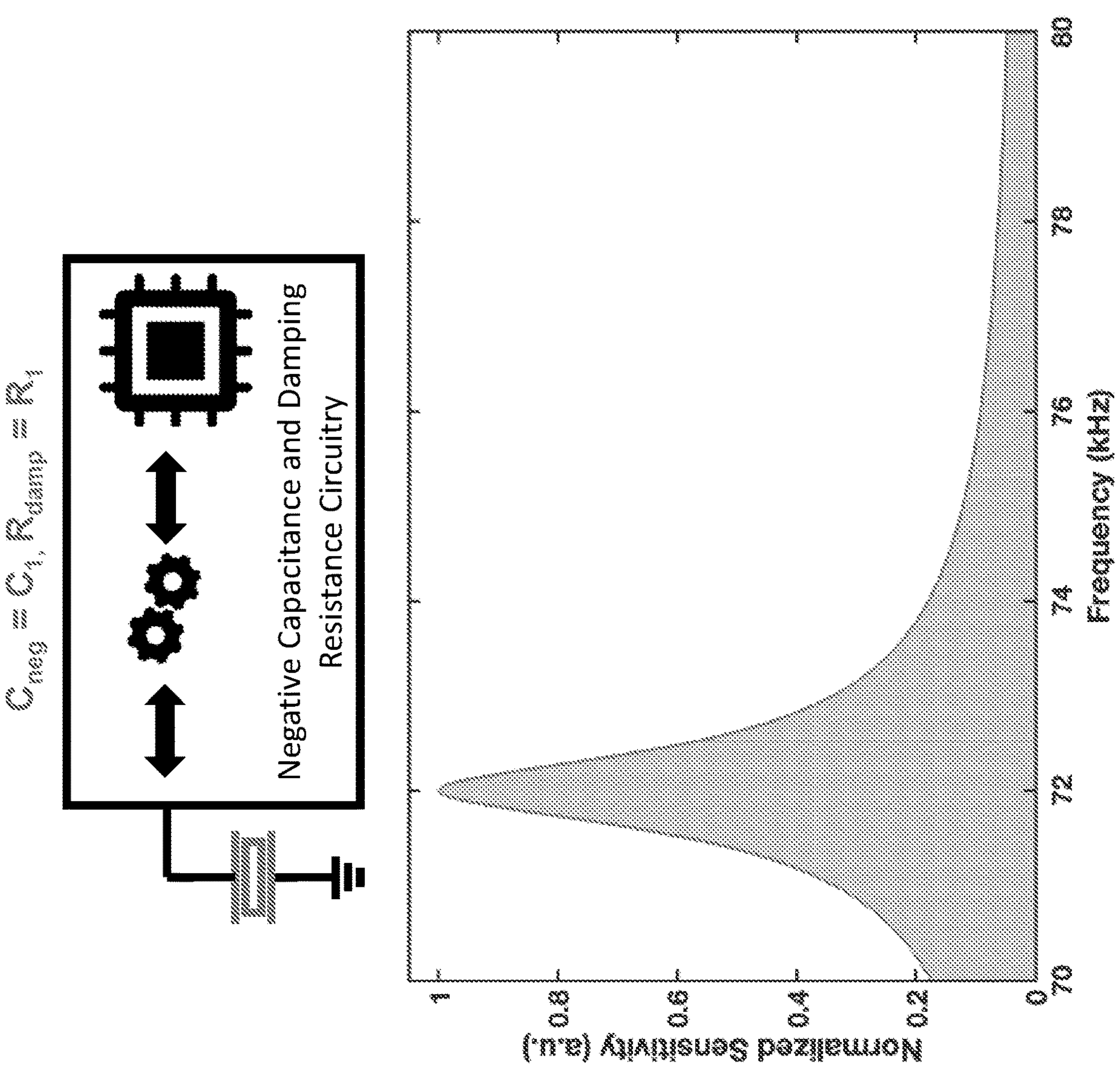
FIGS. 5A, 5B and 5C are three respective illustrations showing exemplary effects of varying amounts of negative capacitance and of damping resistance to change a $f_{res}$ and the transducer bandwidth associated with a transducer-based circuit, according to the present disclosure.
Figure 5B:
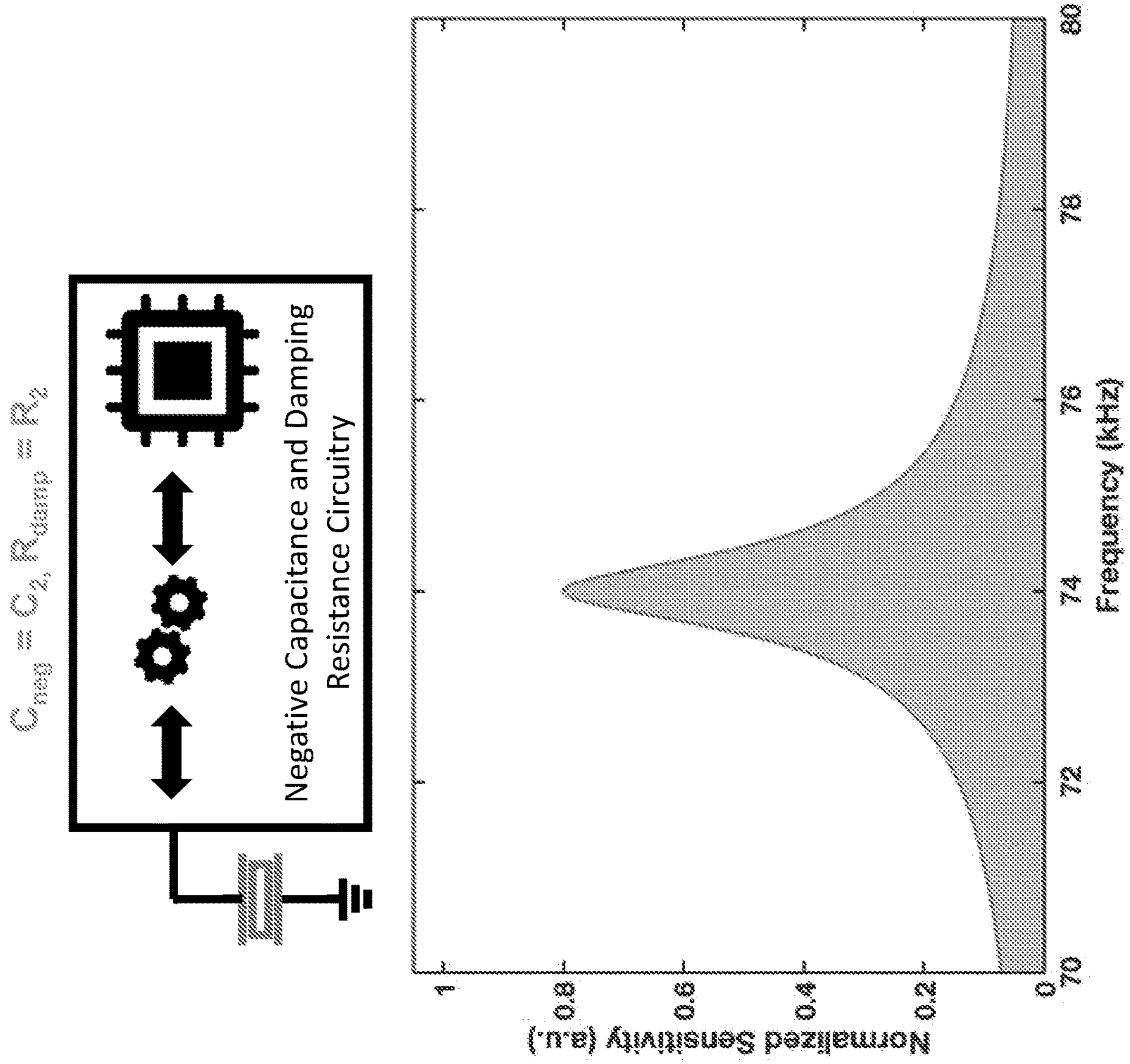
Figure 5C:
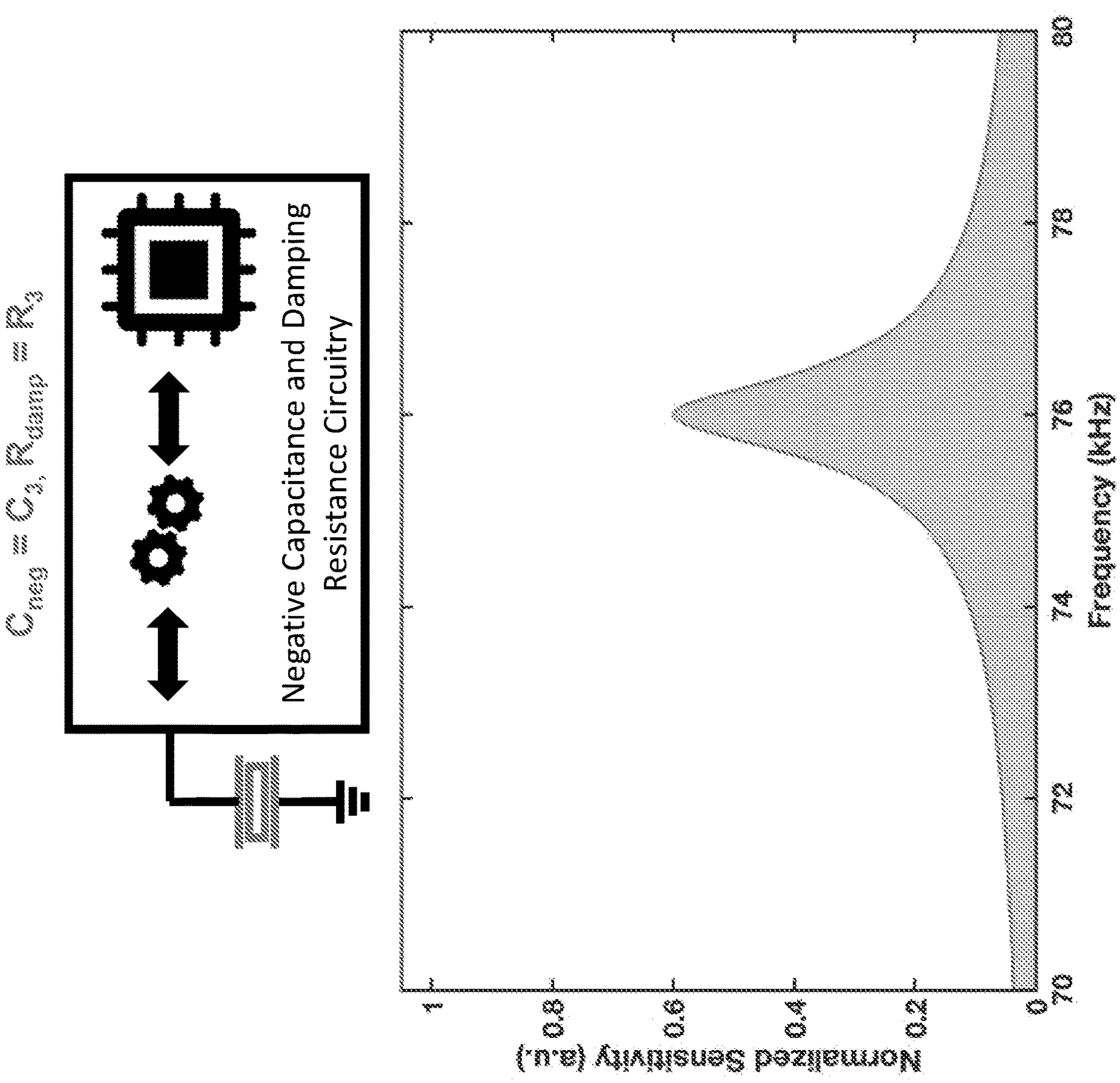

Consistent with the example of FIG. 2, FIGS. 5A, 5B and 5C are three respective illustrations which collectively show, for a single transducer-based circuit and also according to the present disclosure, how controlling both the effective amounts of negative capacitance and damping resistance can change the transducer bandwidth and the transducer resonance frequency. Generally, FIGS. 5A, 5B and 5C respectively correspond to combining the above-discussed aspects of FIGS. 3A and 4A, FIGS. 3B and 4B and FIGS. 3C and 4C. Accordingly, the upper portions of FIGS. 5A, 5B and 5C show the transducer-based circuit having increased effects amounts of negative capacitance ($C_{neg}$) and of damping resistance. Also using a normalized-sensitivity versus resonance-frequency graph underneath, in comparing the effective amounts of negative capacitance and damping resistance in each of the transducer-based circuits, the respective graphs of FIGS. 5A, 5B and 5C show these amounts increasing. In this manner and again as depicted in FIG. 2, by changing both the negative resistance and the damping resistance, the transducer resonance frequency and the transducer bandwidth is set, tuned and/or programmably controlled. This type of control can be used in a variety of manners for optimizing communications, for example, in terms of mitigating interfering signals, permitting changing communication parameters for more secure communications, maximizing signal strength at receiver circuitry configured to receive a wireless signal in response to such a transducer circuit, and/or set one or more communication parameters (e.g., a specific range of negative capacitance and/or a specific range of damping resistance) for allowing secure and/or parameter-aligned communications.

Figure 6A:
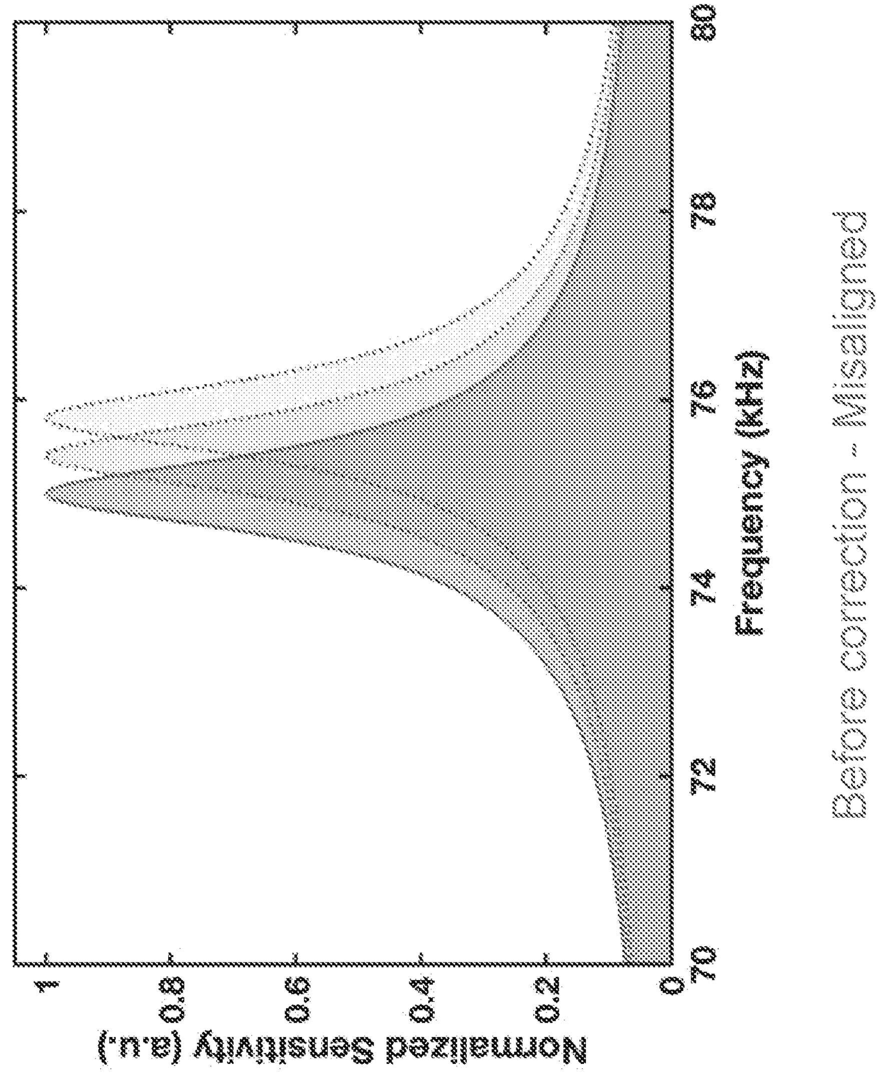
FIGS. 6A and 6B are respective graphs showing a manner of alignment relative to a given $f_{res}$ for an array of transducer-based circuits which are collectively shown in FIG. 6C, according to the present disclosure.
Figure 6B:
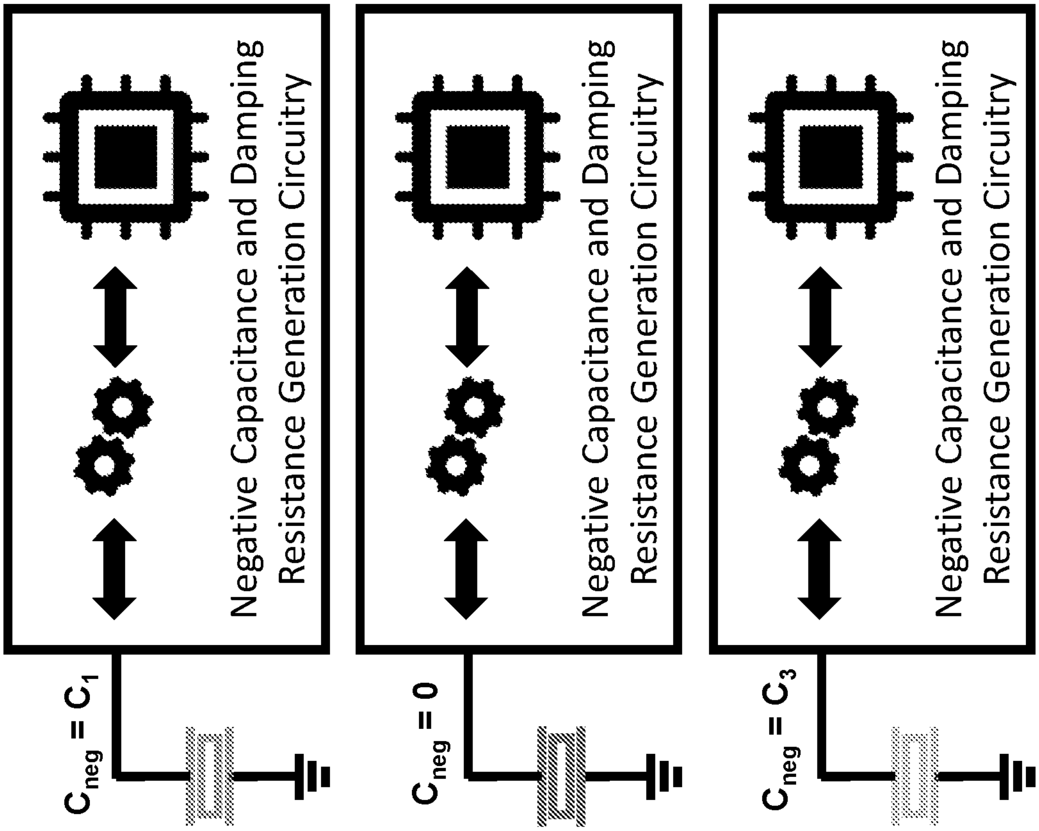
Figure 6C:
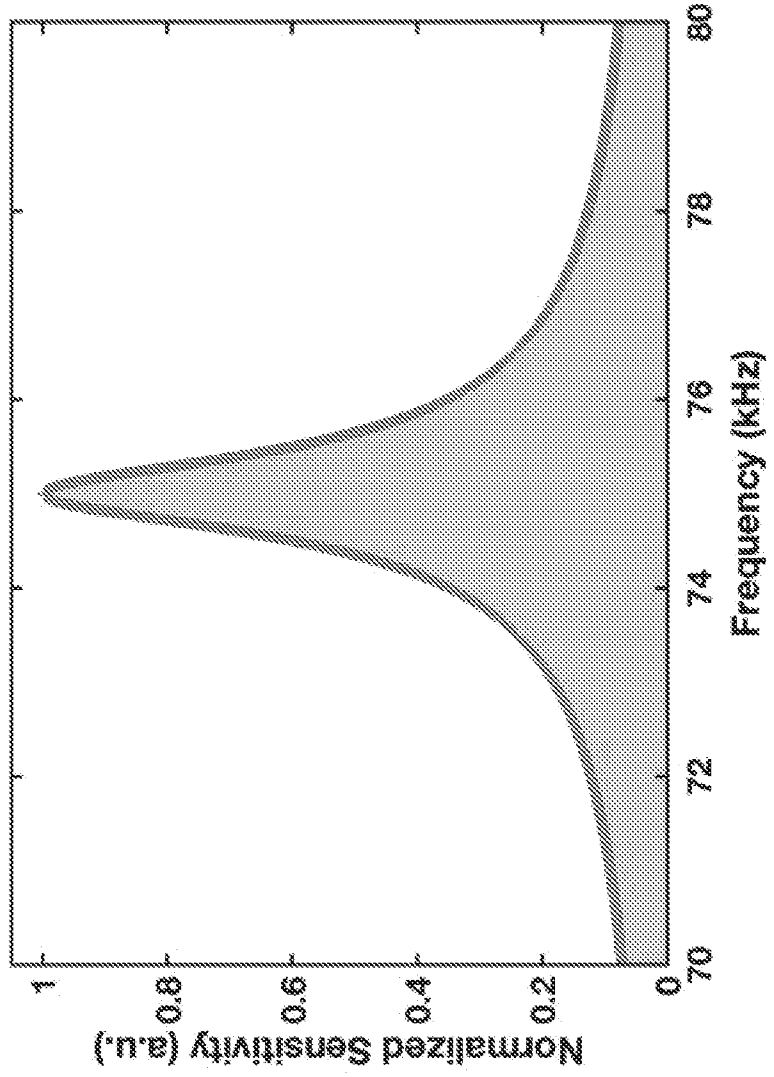

FIGS. 6A and 6C are useful for describing a more specific example of setting communication parameters for parameter-alignment in communications involving an array of transducer-based circuits as in FIG. 6B. In this particular non-limiting example, one or more elements of each transducer-based circuit in the array were fabricated to be identical and intended, by way of such fabrication, to have identical parameters in terms of $f_{res}$ and associated transducer bandwidth. The array of transducer-based circuits includes: a first transducer-based circuit having $C_{neg}$ set at a first level of negative capacitance $C_1$, a second transducer-based circuit having $C_{neg}$ set at a second level of zero negative capacitance, and a third transducer-based circuit having $C_{neg}$ set at a second level of negative capacitance $C_3$. As shown in FIG. 6A, the fabrication inadvertently led to non-identical parameters such as parasitics (e.g., linked to components such as capacitors) and misaligned responses (relative to given $f_{res}$ at 75 kHz) as is sometimes common due to process variations occurring during the fabrication. However, as shown in the aligned responses of FIG. 6C and according to aspects of the present disclosure, by applying the correct amount of (programmable) negative capacitance and damping resistance, identical responses across the elements can be realized.

Figure 7A:
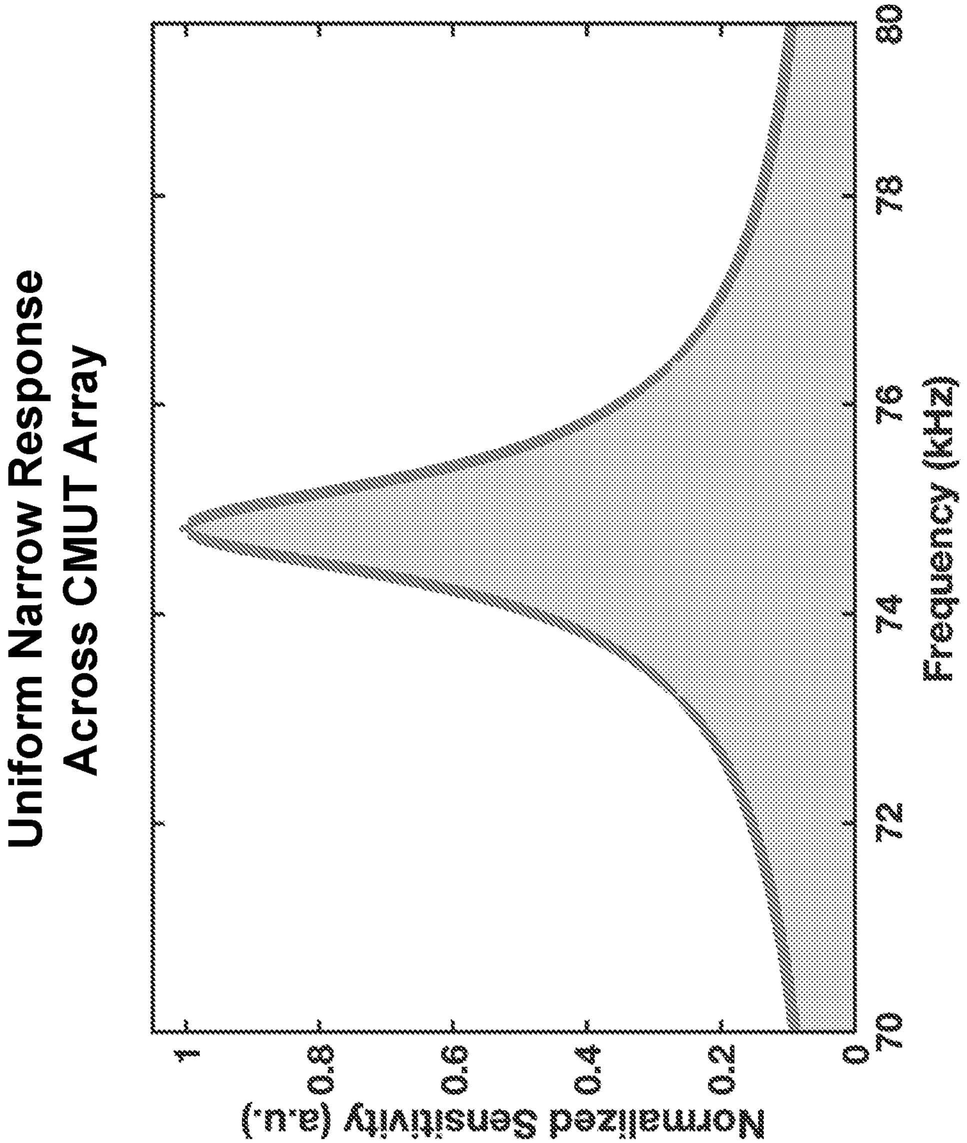
FIGS. 7A and 7B are respective graphs (with FIG. 7B including corresponding circuitries) showing responses, associated with a transducer-based circuit array, according to the present disclosure.
Figure 7B:
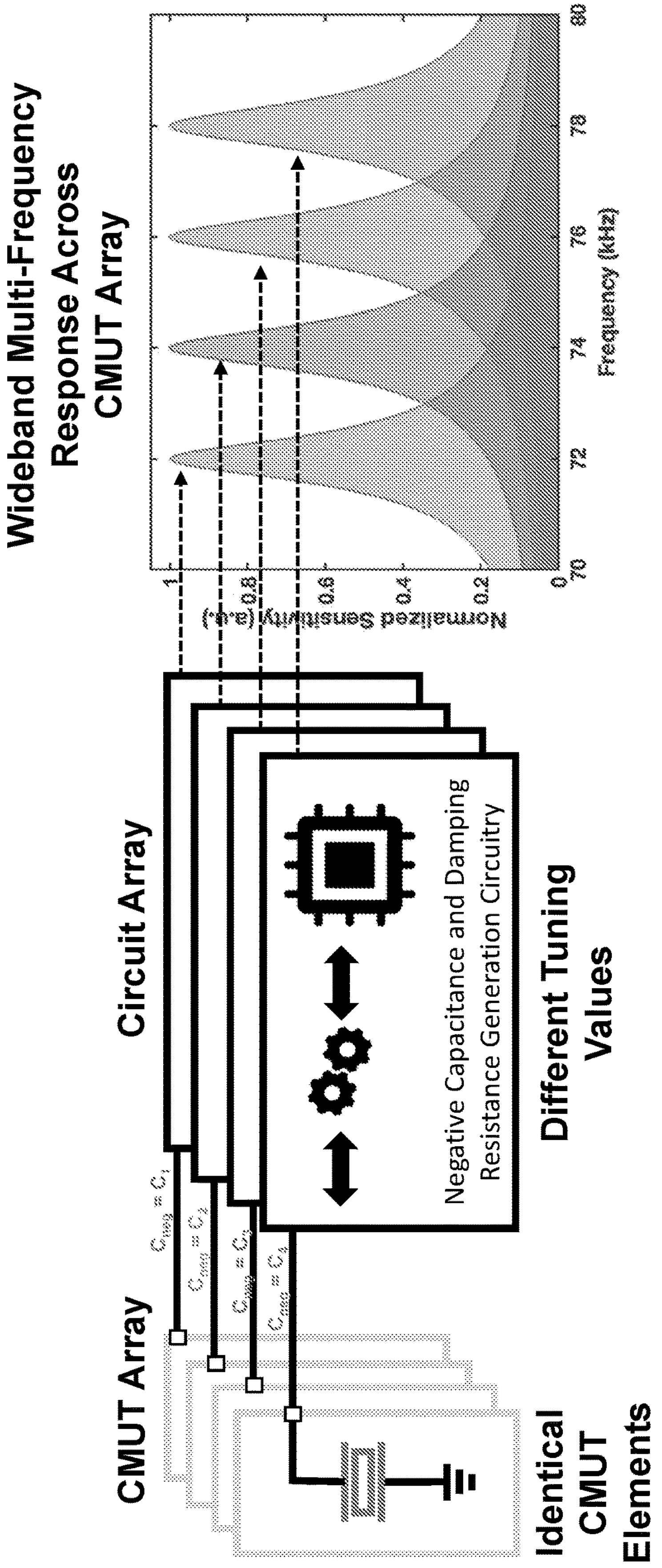

FIGS. 7A and 7B illustrate corresponding responses of another transducer-based circuit array, as depicted in FIG. 7B, with according to the present disclosure. FIGS. 7A and 7B are useful in showing how, by configuring each transducer-based circuit of the array as exemplified with a programmable negative capacitance and a programmable damping resistance, a multi-frequency, wideband response across the array (or a plurality of non-arrayed) elements, may be used to improve performance of a transducer-based system. Consider, for example, each of the transducer-based circuits in the array of FIG. 7B corresponding to an acoustic CMUT-type transducer circuit (as may be generally exemplified in FIG. 2 or by way of another form such as disclosed supra), with a programmable negative capacitance and a programmable damping resistance. The transducer-based circuits in the array of FIG. 7B correspond to such a circuit but each with a negative capacitance and/or damping resistance which are/is different (e.g., as may be programmably set). In FIG. 7B, one such circuit of the array appears in the foreground (closest to the viewer) and is depicted as having the highest amounts of negative capacitance ($C_{neg}=C_4$) for setting a corresponding resonance frequency at 78 kHz. The next three circuits of the array (being further removed from the foreground are respectively depicted as having reduced amounts of negative capacitance ($C_{neg}=C_3$, $C_2$, $C_1$) for setting respectively corresponding resonance frequencies at 76 kHz. 74 kHz and 72 kHz. In this manner, with the transducer-based circuits of the CMUT array being fabricated to have identical elements, by tuning the programmable parameters of the transducer-based circuits (e.g., the programmable negative capacitance and/or programmable damping resistance), a multi-frequency, wideband response can be realized across the array (or across a plurality of non-arrayed elements. This may be implemented, for example, to improve performance (e.g., the acoustic frequency range or communication data rate) of an acoustic system which utilizes transducer-based circuits.

Figure 8A:
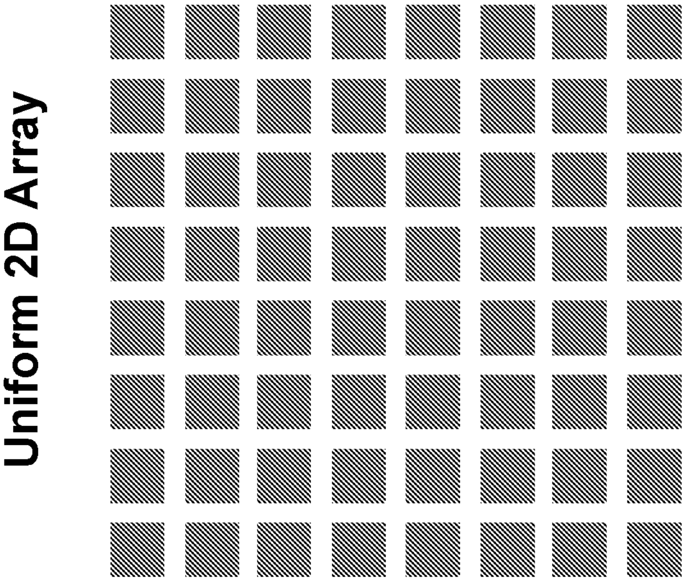
FIGS. 8A, 8B and 8C are respective transducer-based circuit arrays, according to the present disclosure.
Figure 8B:
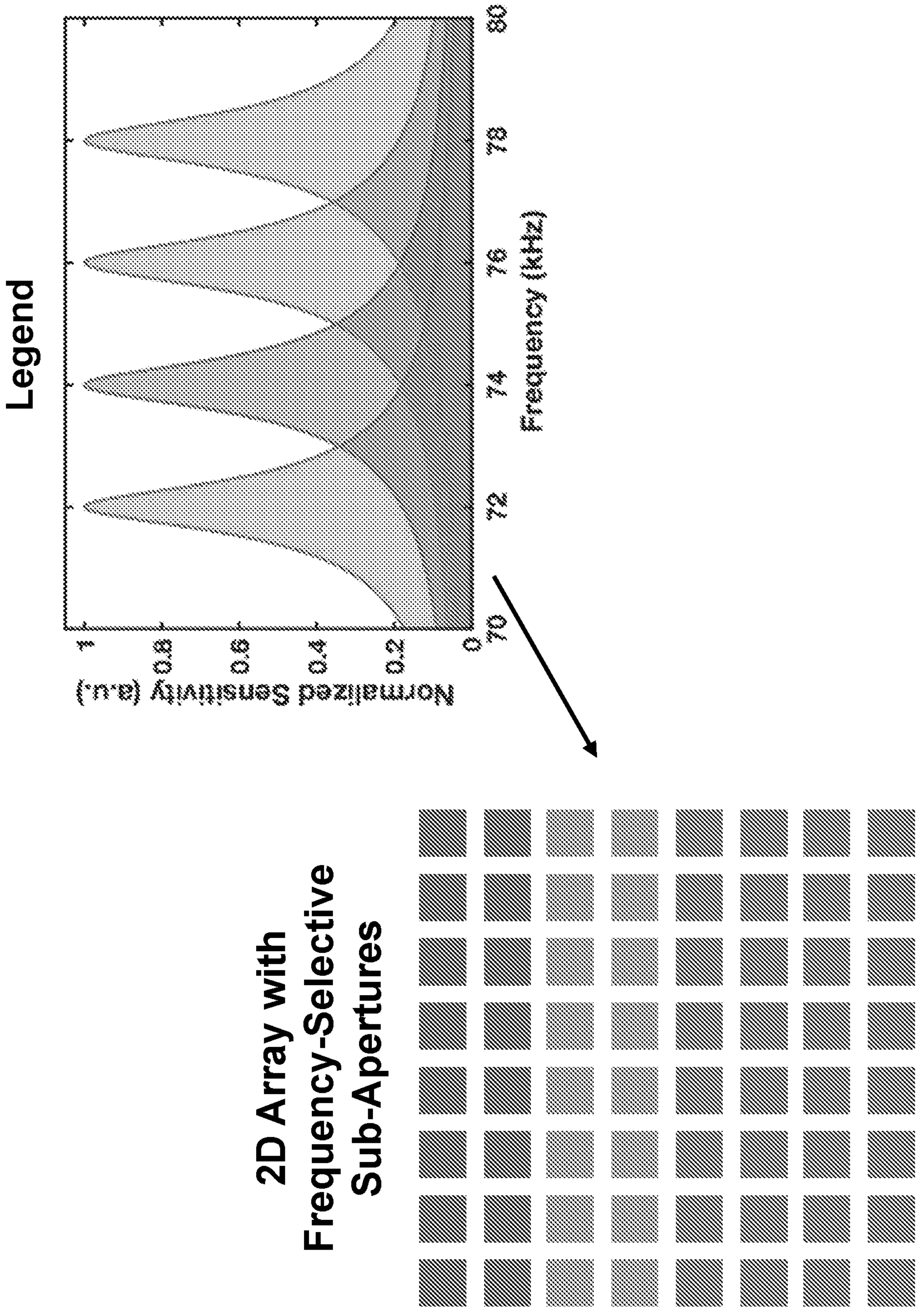
Figure 8C:
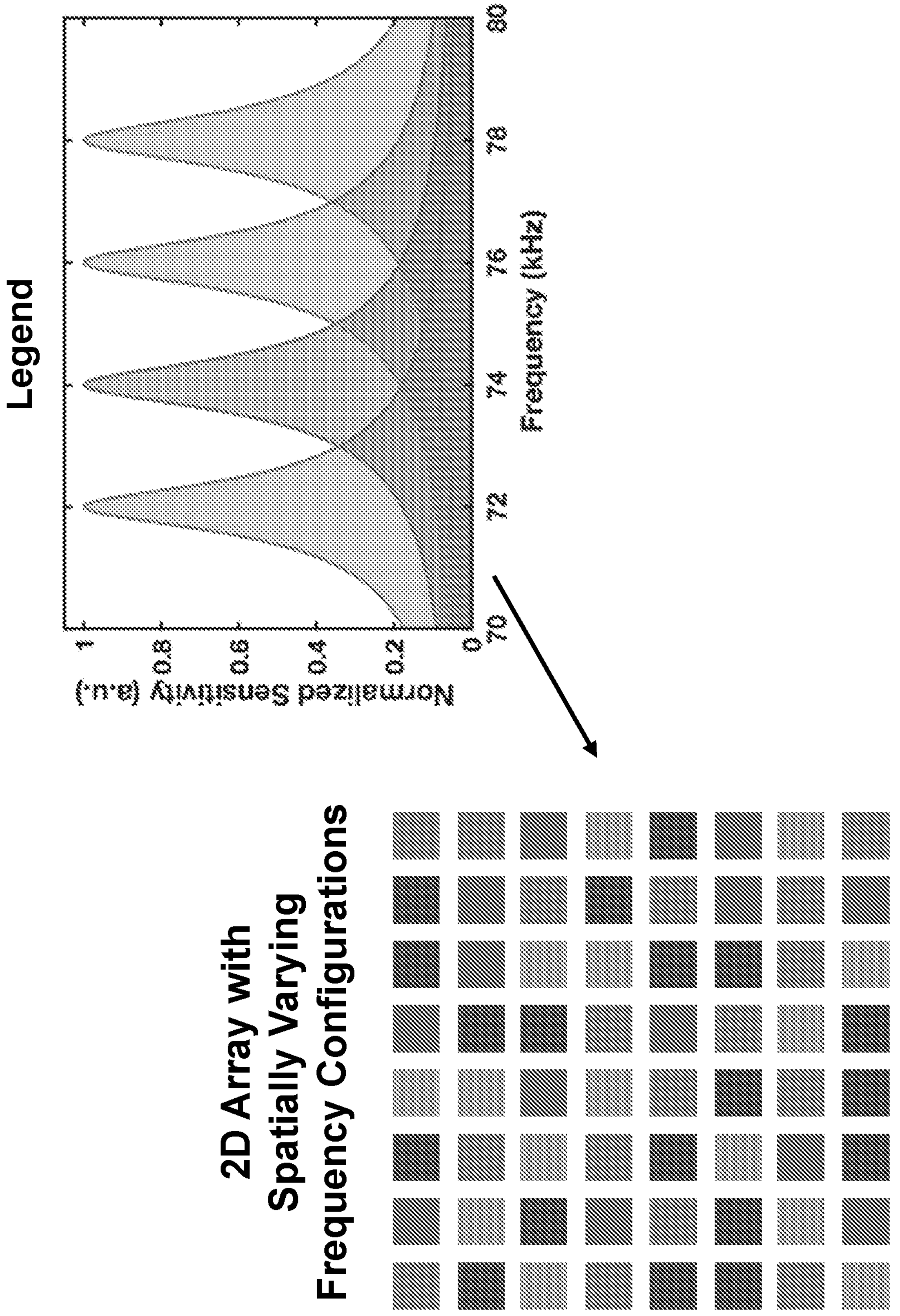

FIGS. 8A, 8B and 8C are respective transducer-based circuit arrays, according to the present disclosure, showing an example of how the respective frequency responses of each element in the array can be independently set (e.g., statically and/or on-the-fly such as in real time or near real time). While not shown in connection with FIGS. 8A, 8B and 8C, each array is associated with a controller (e.g., logic circuitry including a multiplexer and/or computing processor) with element-addressing circuitry to select each programmable set of one of more elements in the array. With respect to such a controller and/or element-addressing circuitry, this approach may have the controller and/or element-addressing circuitry being integrated with the array such as part of an integrated circuit chip or chip set, and/or may have the controller and/or element-addressing circuitry being external and communicatively coupled to the array by an access port (e.g., an address bus).

FIG. 8A depicts a uniform two-dimensional (2D) array with each element in the array corresponding to an aperture (e.g., one of a plurality of subaperatures) and with each element (or subgroups of elements) capable of being independently set by such a controller for a common response in terms of resonance frequency and/or transducer bandwidth. In a colored view, FIG. 8A would show each of the elements in the array having a common color (e.g., brown) to depict the frequency response of each element in the array being same. For example, the controller may set or programmably change all the elements in the array for the same response and this may be achieved, for example, concurrently or in a particular order (e.g., sequentially by individual elements, individual rows of elements, individual columns of elements, etc.).

FIG. 8B depicts a similar-constructed 2D array but different from the array of FIG. 8A in that each element (or each subgroup of elements) in the array of FIG. 8B is capable of being independently set by such a controller for an independent response in terms of resonance frequency and/or transducer bandwidth. The particular example of FIG. 8B depicts an eight-by-eight array, with multiple subgroupings (e.g., two rows per subgroup, depicted as sharing a common color such as brown, pink, purple and green) organized by proximity to provide respective sets of responses (each in terms of resonance frequency and/or transducer bandwidth). This organization is advantageous in that a controller configured to independently address each of the subgroupings in a time efficient manner (e.g., carried out by a microcomputer with few instructions and only one address for each subgroup in the array). Advantageously and as may be appropriate for any of multiple implementations, such a controller can be used in connection with any of the array-specific examples or features discussed herein.

FIG. 8C is similar to FIG. 8B but in FIG. 8C the 2D array is configured with the elements of the array in spatially-varying frequency-response configurations. This type of an array can be also used for different purposes including the examples discussed in connection with the array-specific advantages/features discussed herein. For example, each element of the array be capable, by way of a controller, of being independently set for an independent response in terms of resonance frequency and/or transducer bandwidth. Alternatively and as in the particular example of FIG. 8C depicted by way of a seemingly-random distribution of four different types of elements, the controller may select for purposes of programming (e.g., setting to a value, increasing a relative setting, and/or decreasing a relative setting) one of multiple subgroupings according to common response (e.g., selecting a subgroup characterized by elements identified as depicted as sharing a common color such as brown, pink, purple and green) as spatially located at the various predefined positions of the array.

As yet another feature in connection with any of the array-based examples of FIGS. 8A, 8B and 8C, the controller may implement any of multiple processes (or algorithms) by which the elements may be initially set so as to be addressed and used in connection with one of the arrays consistent with the approaches of FIG. 8A, FIG. 8B or FIG. 8C. As an initial step of such processes: each element is initially energized and its response is assessed: each of various logical groups of elements (e.g., adjacently located/configured similar to FIG. 8B) is initially energized and its response is assessed; and perhaps more similar to FIG. 8C, each of various random groups of elements (e.g., selected with different numbers of elements, at different locations, and/or initial configured for different responses)) is initially energized and its response is assessed. Next, based on the various assessments, a manner of organizing the elements of the array is defined for realizing a particular response in terms of resonance frequency and/or transducer bandwidth.

Subsequent steps may be implemented as may be appropriate for each type of implementation. As examples, such subsequent steps may be carried out for maintaining secure communications between transmitting and receiving circuits using the array to channel data (e.g., by modulating a channel or output signal using the transducer circuit), maintaining and resetting the response with degradation of component values which tend to change the response over time, and maintaining and resetting the response with changes of the response due to environmental-related stresses (e.g., humidity, temperature, voltage-related stresses).

Figure 9:
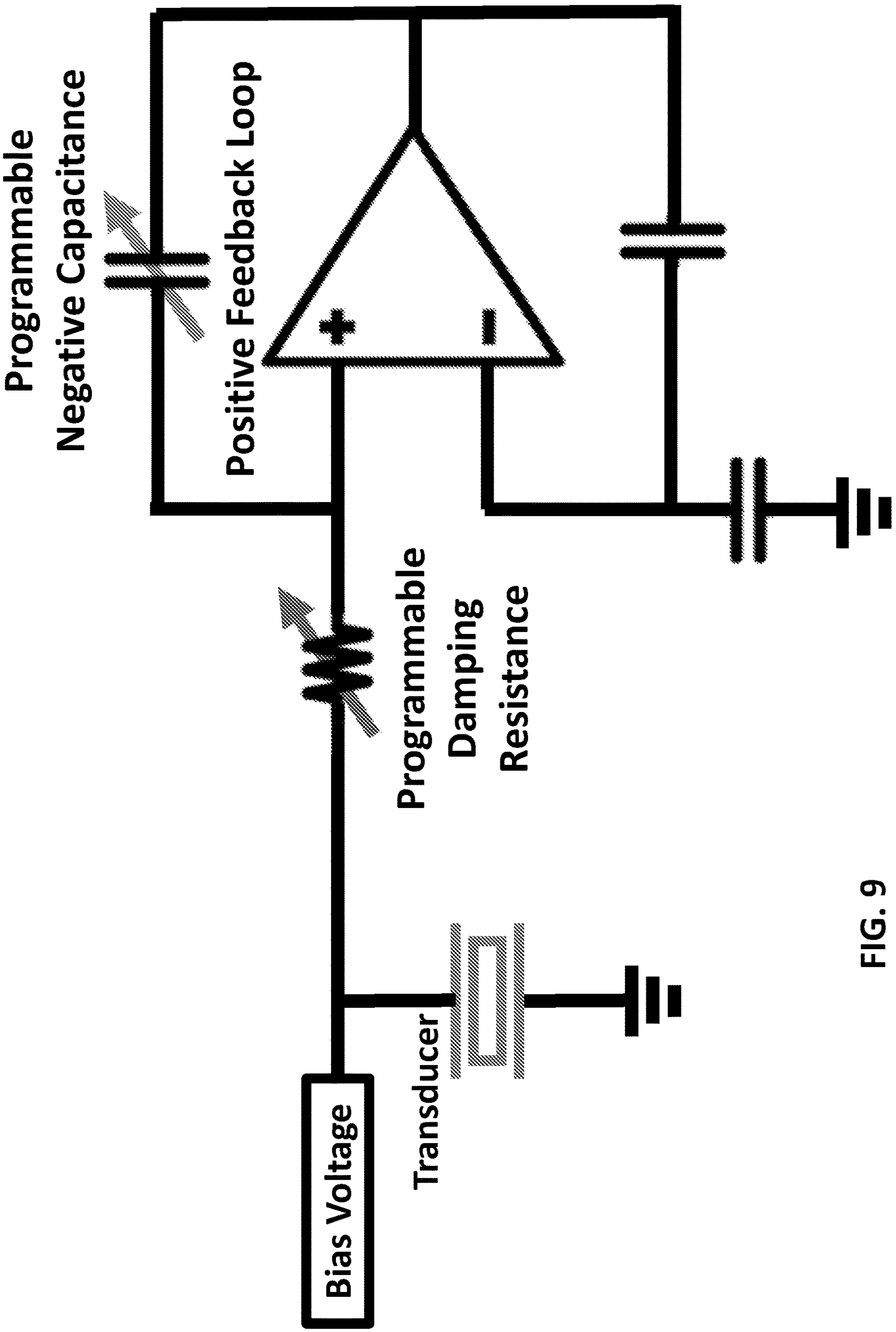
FIG. 9 is an exemplary negative capacitance generation circuit with programmable damping resistance, according to the present disclosure.
Figure 10:
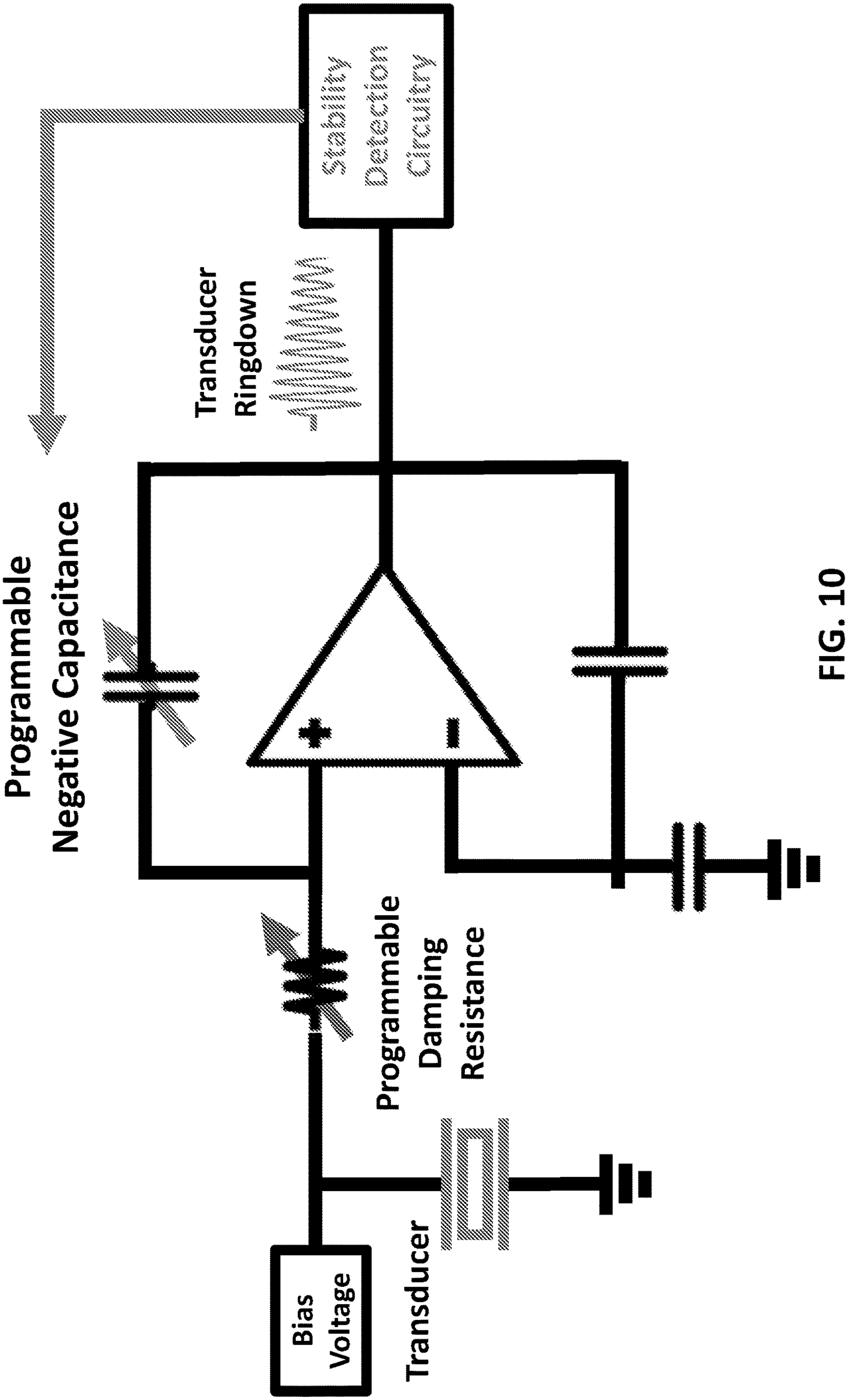
FIG. 10 is another exemplary negative capacitance generation circuit, according to the present disclosure.
Figure 11:
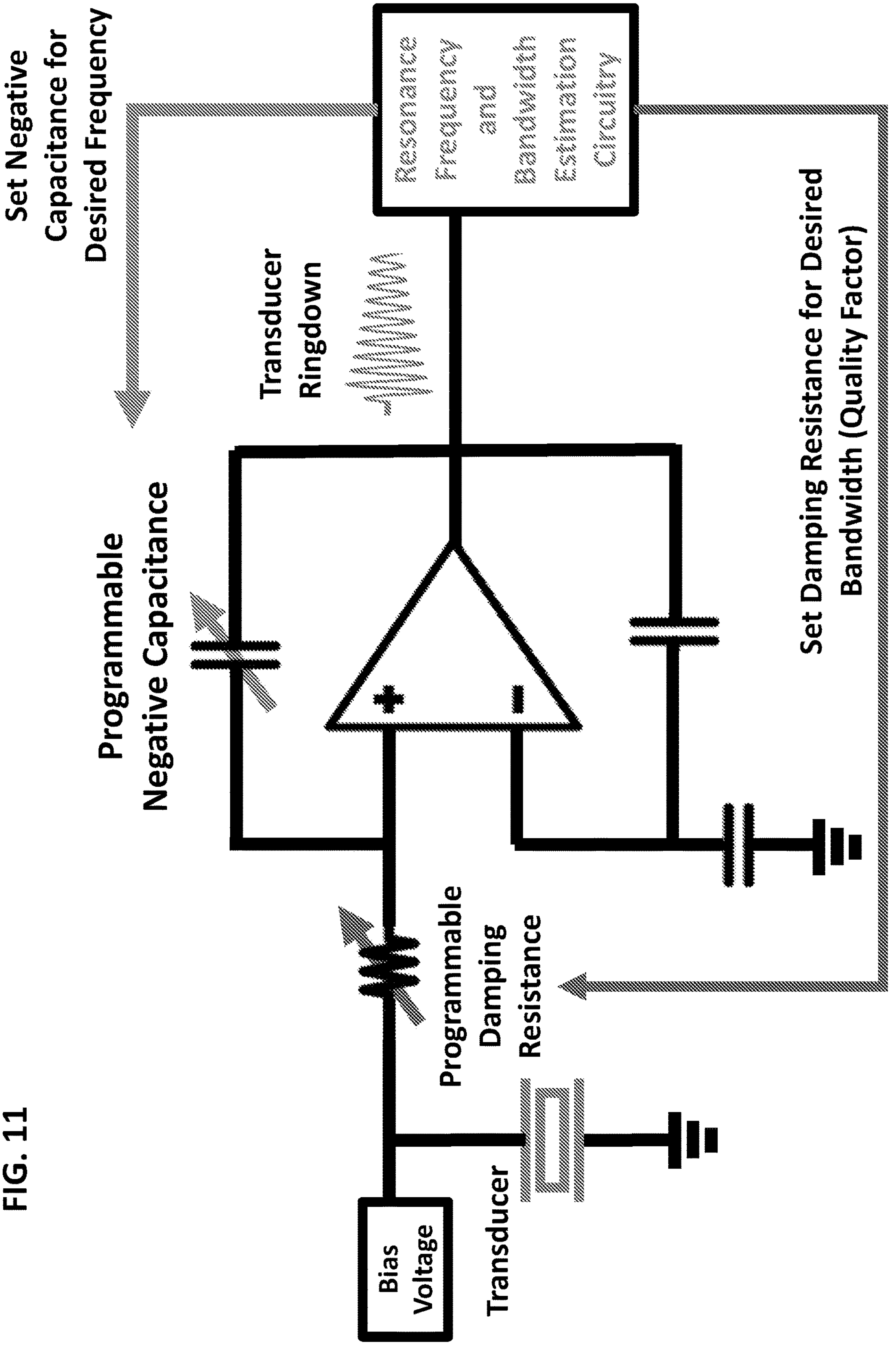
FIG. 11 is yet another exemplary negative capacitance generation circuit, according to the present disclosure.

FIGS. 9, 10 and 11 depict different versions of another type of negative-capacitance transducer-based circuit for generating an output signal having programmability for setting the resonance frequency and/or the transducer bandwidth. In each instance, the output signal is generated via a transistor-based circuit which is depicted in each of these FIGS. 9, 10 and 11 as an operational amplifier.

FIG. 9 shows such an exemplary negative capacitance generation circuit, according to the present disclosure, with a programmable negative capacitance in a positive feedback loop from positive input terminal to output terminal of the operational amplifier and with a programmable damping resistance between a junction (or node) at which a bias voltage energizes the transducer and the positive input terminal of the operational amplifier. These programmable elements shown in FIG. 9 may be used, as discussed in connection with the examples as previously-discussed herein, to set a desired resonance frequency and/or transducer bandwidth.

FIG. 10 shows another example of a negative capacitance generation circuit according to the present disclosure, with this example being similar to the example of FIG. 9 but with a stability detection circuit at the output terminal of the operational amplifier. These programmable elements shown in FIG. 10 may be used, as discussed in connection with the previously-discussed examples and with the added feature of having the stability detection circuit being implemented in a feedback loop to set the programmable negative capacitance based on an automatic determination, made by an assessment of the circuit's response (e.g., in terms of resonance frequency). As one example implementation, the stability detection circuit may provide a cancellation value (e.g., cancelling up to a maximum a certain amount of the negative capacitance setting) in response to a detected level shift or change in resonance frequency. In alternative examples according to the present disclosure, different types of stability detection circuits are employed and are based, for example, on transducer ringdown response, impulse response and/or other parameters.

FIG. 11 expands on the example of FIG. 10 by providing feedback by replacing the stability detection circuit of FIG. 10 with a resonance-frequency and bandwidth-estimation circuit. In the example of FIG. 11, the programmable elements may also be used, as discussed in connection with the previously-discussed examples and with the added feature of having the resonance-frequency and bandwidth-estimation circuit being implemented to provide a feedback loop to set a selected one or both of the programmable parameters, the negative capacitance and/or the damping resistance (quality factor). This feedback is based on the circuit's automatic determination, made by an assessment of the circuit's response (e.g., in terms of resonance frequency and/or bandwidth). As one example implementation, the stability detection circuit may provide a cancellation value (e.g., cancelling up to a maximum a certain amount of the negative capacitance setting and/or a certain amount of the damping resistance setting) in response to a detected level shift or change in resonance frequency and/or bandwidth. In alternative examples according to the present disclosure, different types of resonance-frequency and bandwidth-estimation circuit are employed and are based, for example, on transducer ringdown response, impulse response, desired distribution of energy in certain bandwidth, etc.

Discussion now turns to certain more-detailed and/or experimentally-directed example embodiments, for example, pertaining to proof of concept for certain aspects of the present disclosure. In one such example embodiment, electronic circuitry has been designed to be integrated with or interface with an air-coupled capacitive micromachined ultrasound transducer (CMUT) element, and using this electronic circuitry certain measurement are made in connection with such experimental efforts. While the measurement results pertain to an air-coupled CMUT element, the examples of the present disclosure show that similar examples can also be applied to other types of transducers, including but not limited to air-coupled and immersion-based acoustic transducers such as piezoelectric transducers, other capacitive micromachined ultrasound transducers (CMUTs), piezoelectric micromachined ultrasound transducers (PMUTs), and electrostatic transducers among others.

In such experimental efforts, electrical characterizations are conducted in the form of impedance measurements, demonstrating the frequency tunability of the above-discussed approaches and exemplary advantages which certain of these examples may realize (depending on the implementation) over previously-known circuits. For example, such experimental efforts have include acoustic characterizations via pitch catch experiments with a calibrated microphone, demonstrating improved sensitivity and no deterioration in CMUT minimum detectable pressure (also verified via simulations). Further, while certain of the measurement results show frequency tunability in the 50-100 KHz range, this is merely for a proof-of-concept/experimental example. With finer grained capacitance cancellation, various examples, according to aspects of the present disclosure, readily realize operation at frequencies as low as one MHz to several tens of MHZ, at higher frequencies, and/or at wider (or narrower) synthesized bandwidths for air-coupled and immersion transducers to enable improved (higher) levels of resolution imaging and improved (higher) data rate communication relative to performance provided by previously-known examples.

Figure 12A:
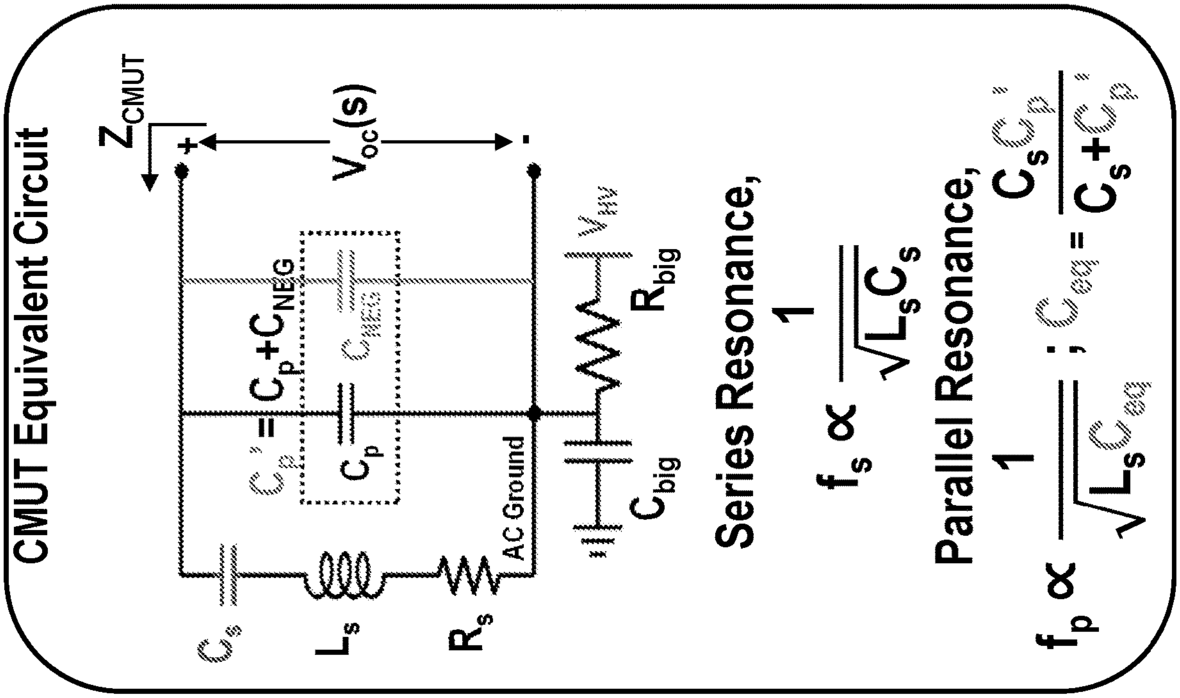
FIGS. 12A and 12B show an equivalent circuit diagram (FIG. 12A) of a transducer-based circuit and a graph (FIG. 12B) showing impedance measurement resonance frequency tuning using negative capacitance of the transducer-based circuit, according to the present disclosure.
Figure 12B:
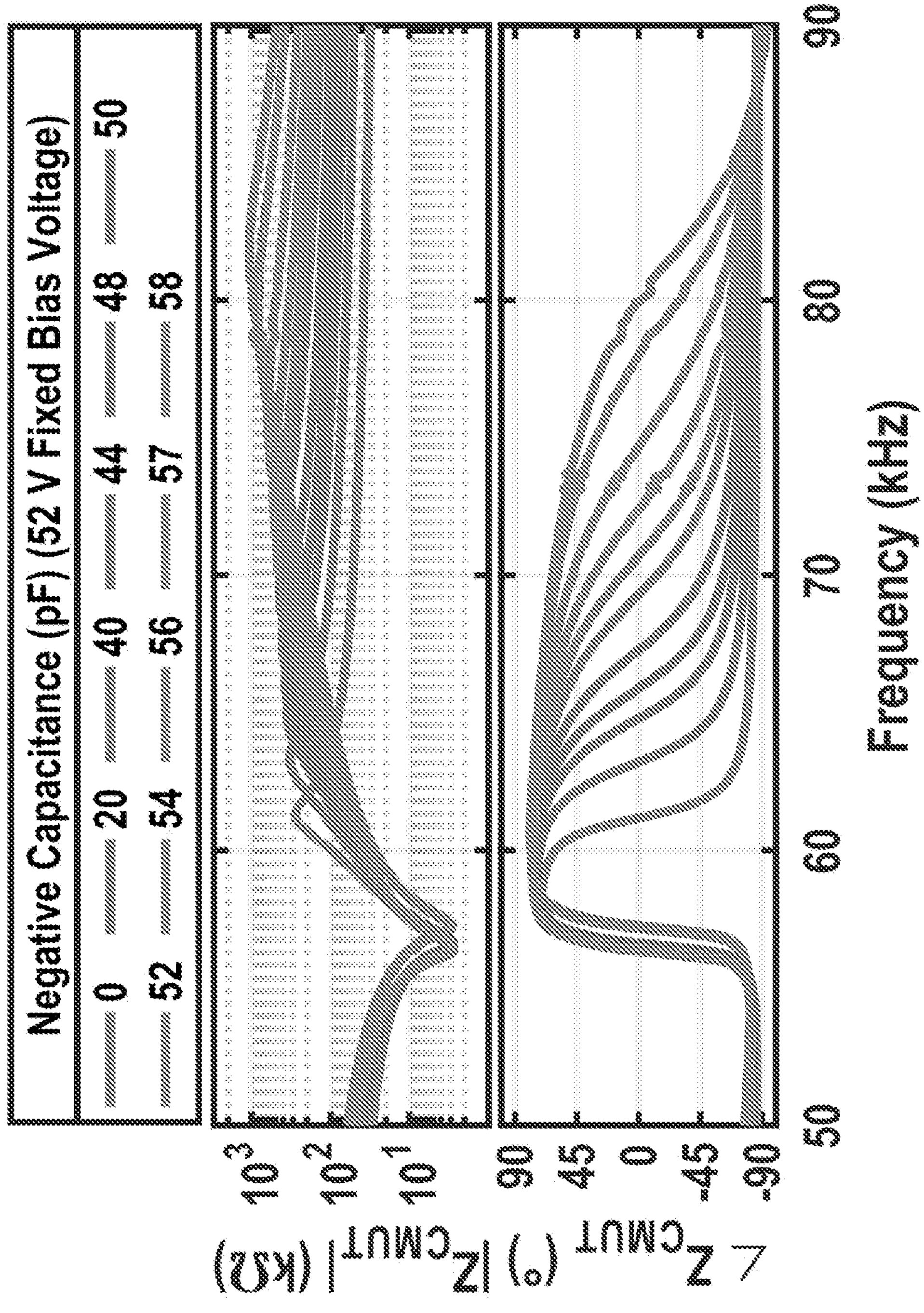

FIGS. 12A and 12B, according to the present disclosure, show an equivalent circuit diagram for a negative capacitance CMUT-type transducer-based circuit (FIG. 12A) and a graph (FIG. 12B) showing characteristics relating to impedance measurement frequency tuning using the negative capacitance of the transducer-based circuit of FIG. 12A. The equivalent circuit diagram of FIG. 12A may correspond generally to the example circuits corresponding to that shown in FIG. 1. Consistent with the present disclosure, one highlighted aspect depicted by the illustrations of FIGS. 12A and 12B pertains to the impedance measurement for tuning the resonance frequency. Instead of an impedance measurement which uses the bias voltage to tune the resonance frequency (and consequently realizing low impedance at high frequencies and disadvantageng by not maintaining high sensitivity at all frequencies), according to the present disclosure, impedance measurement is conducted by using the negative capacitance to tune the resonance frequency. This approach has demonstrated realization of high impedance at high frequencies. For example, as in FIG. 12B, more than ten times higher impedance is realized at higher frequencies than when using an impedance measurement based on the bias voltage to tune the resonance frequency. This approach has the advantage of achieving appreciable frequency shifts while maintaining high sensitivity at all frequencies.

Figure 13A:
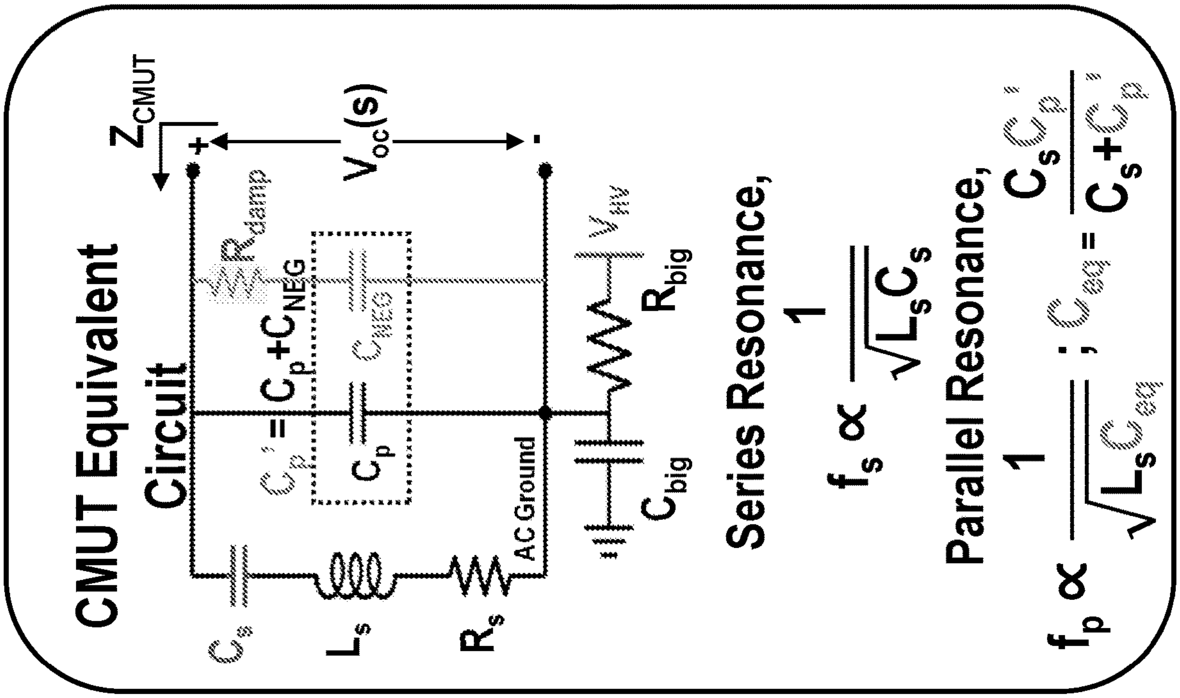
FIGS. 13A and 13B show an equivalent circuit diagram (FIG. 13A) of a transducer-based circuit and a graph (FIG. 13B) showing characteristics relating to impedance measurement bandwidth tuning using damping resistance of the transducer-based circuit, according to the present disclosure.
Figure 13B:
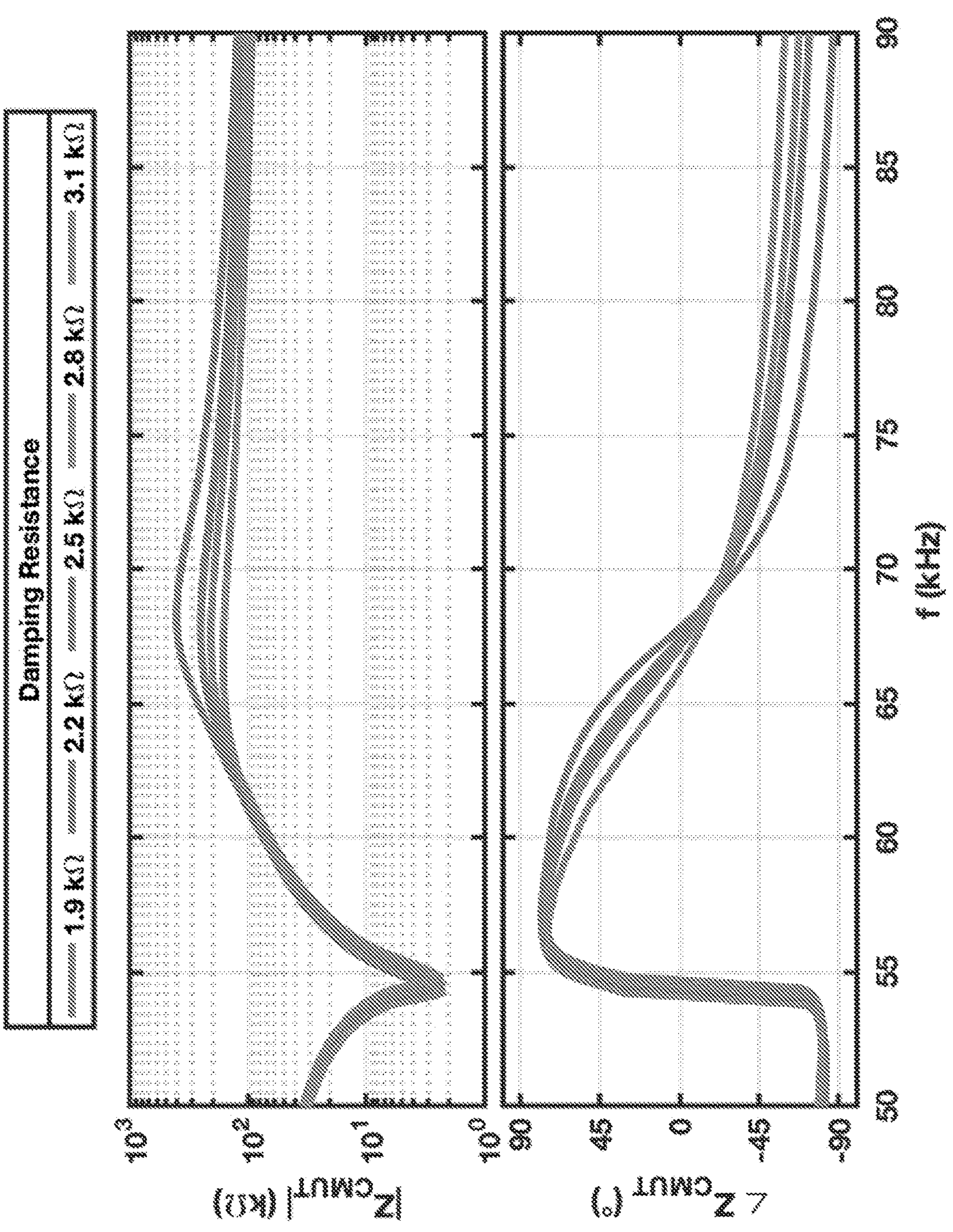

FIGS. 13A and 13B show an equivalent circuit diagram (FIG. 13A) of a negative capacitance transducer-based circuit and a graph (FIG. 13B) showing characteristics relating to impedance measurement bandwidth tuning using damping resistance of the transducer-based circuit. The equivalent circuit diagram of FIG. 13A may correspond generally to the example circuits corresponding to that shown in FIG. 2 (or generally as in FIG. 9). As indicated by the plotting in FIG. 13B, for this experimental effort, the impedance measurement bandwidth tuning using damping resistance allows for an increase in CMUT bandwidth (BW) by using additional damping resistance.

Figure 14A:
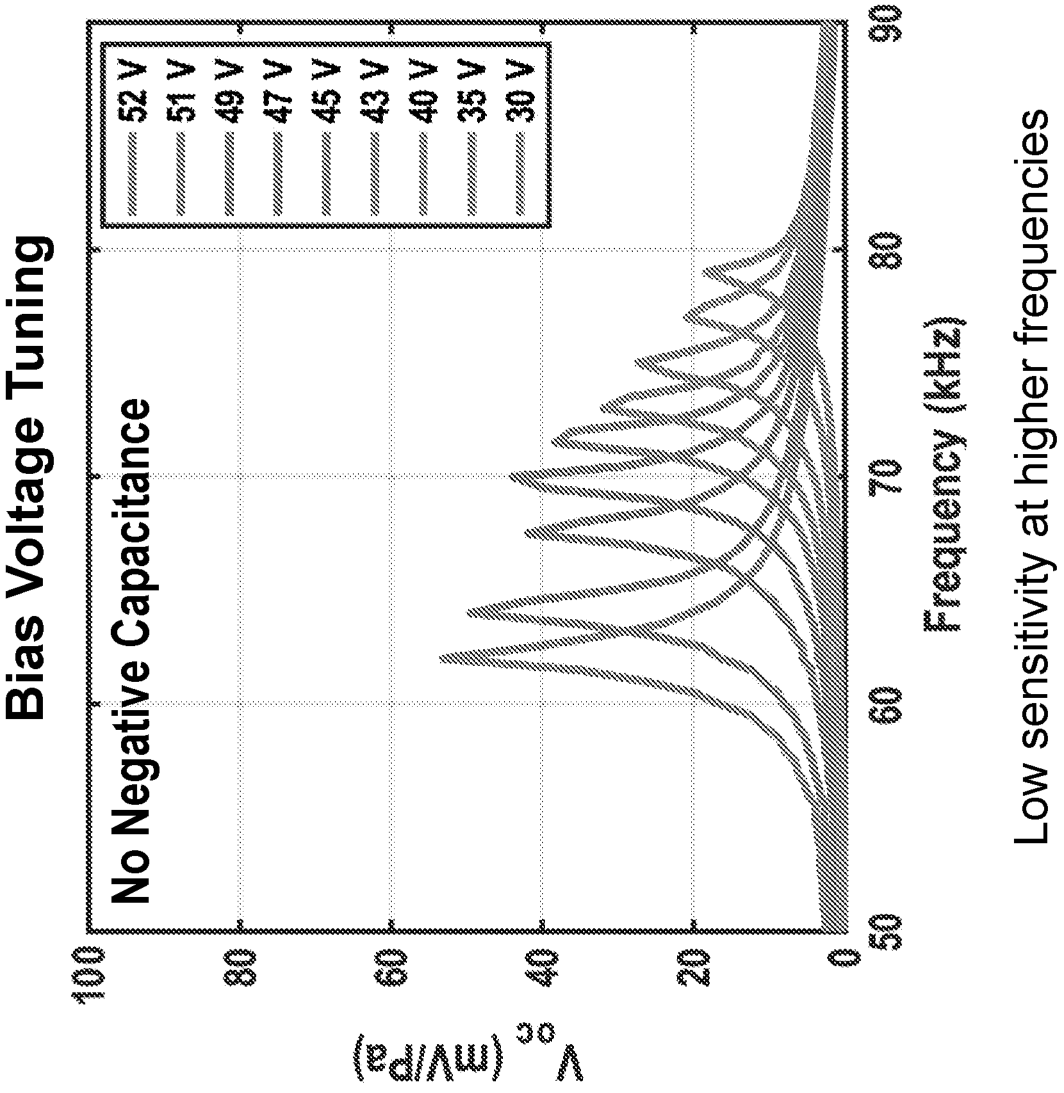
Figure 14B:
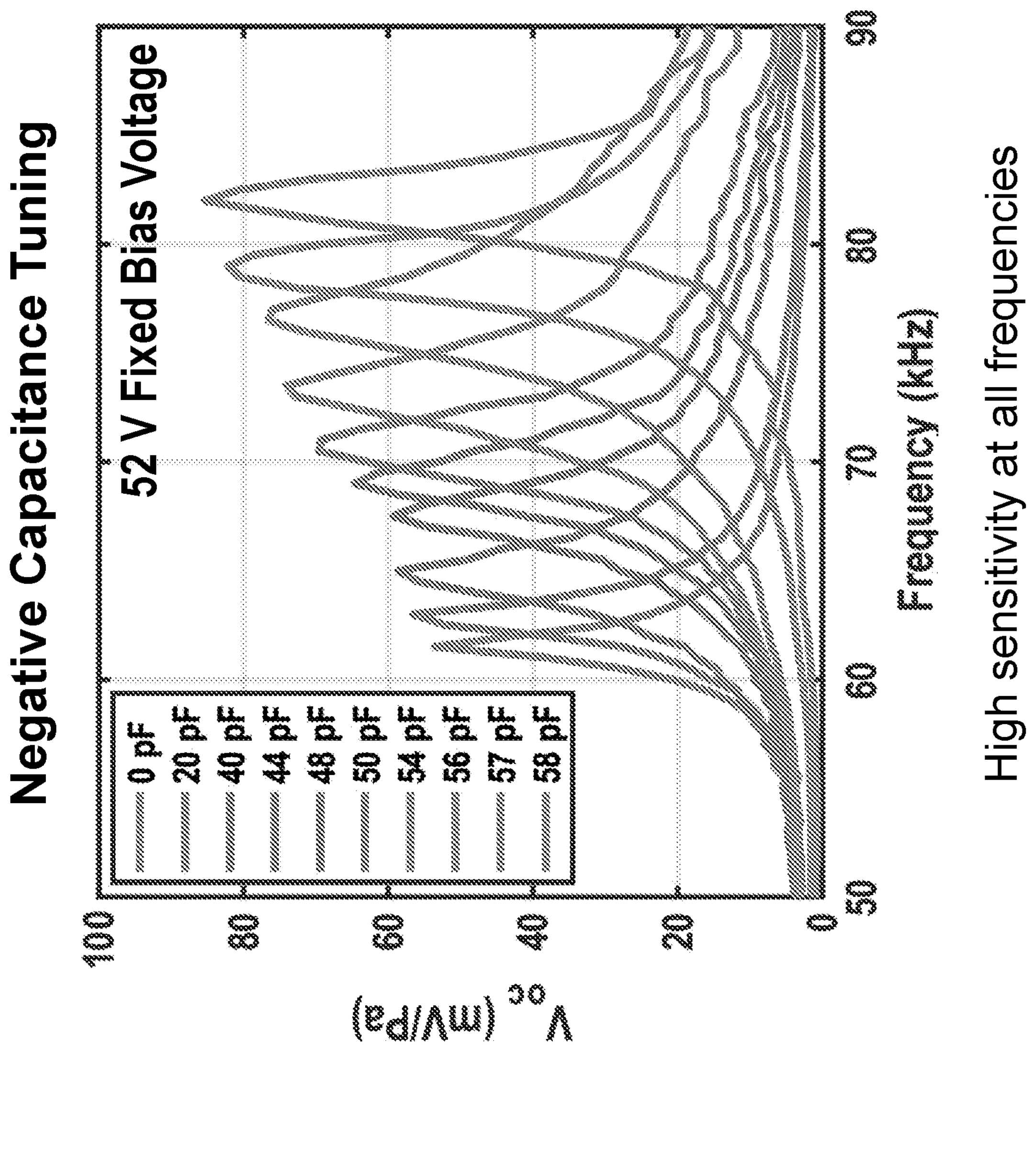

With regards to FIGS. 14A and 14B. FIG. 14A is a graph corresponding to an example previously-known circuit that uses bias voltage tuning (without negative capacitance), and FIG. 14B is a graph showing contrasting characteristics relating to use of an exemplary transducer-based circuit according to the present disclosure. As indicated in connection with the graph of FIG. 14A, by using bias voltage tuning without negative capacitance, the previously-known circuit realizes a significant decrease in sensitivity levels as the resonant frequencies are increased (e.g., from about 62 kHz to 80 kHz) by decreasing levels of bias voltage (e.g., from 52 V to 30 V).

Figure 15A:
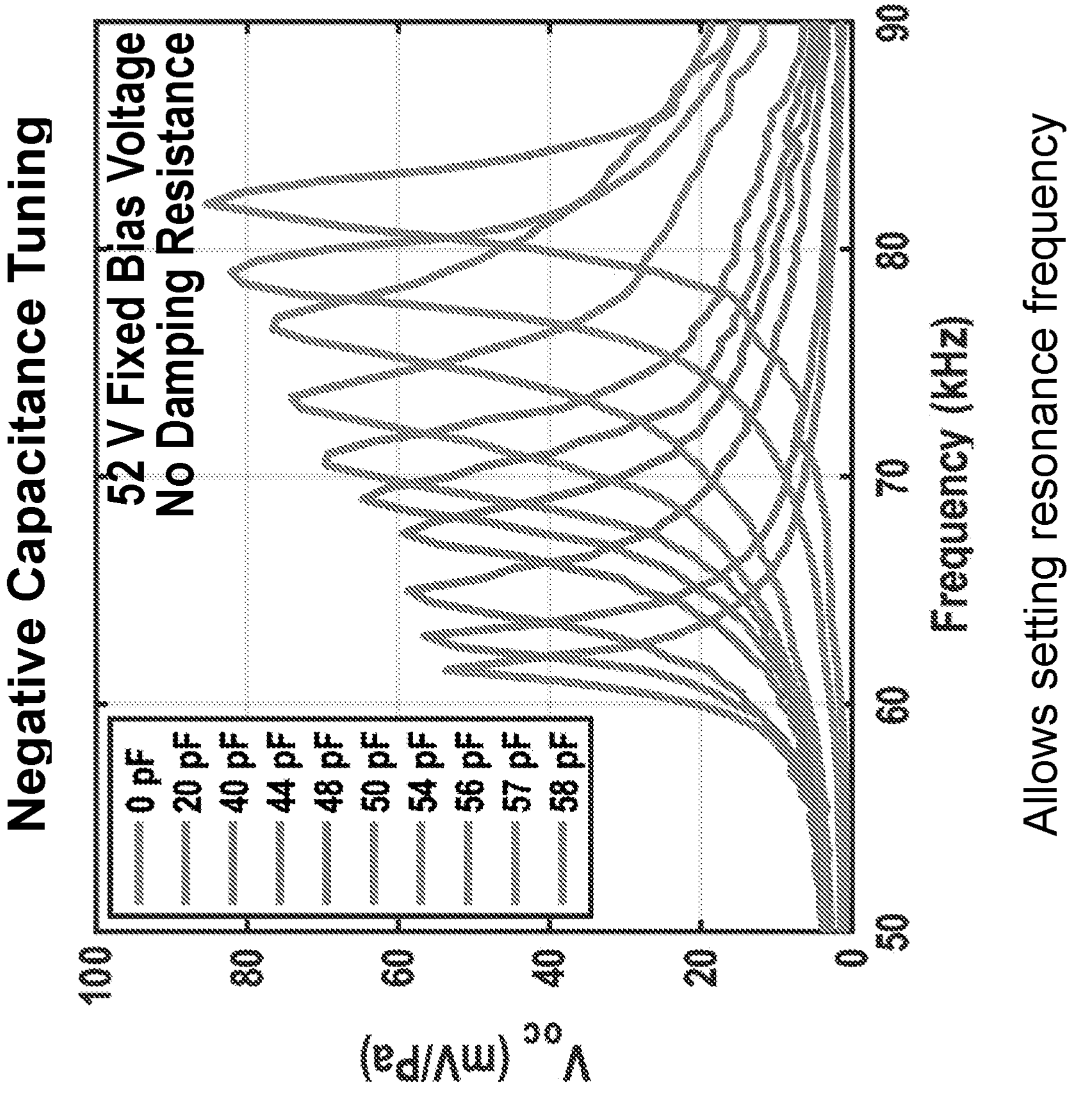
FIGS. 15A and 15B are graphs showing characteristics relating to use negative capacitance tuning (FIG. 15A) and use of damping resistance tuning (FIG. 15B) in connection with an exemplary transducer-based circuit, according to the present disclosure.
Figure 15B:
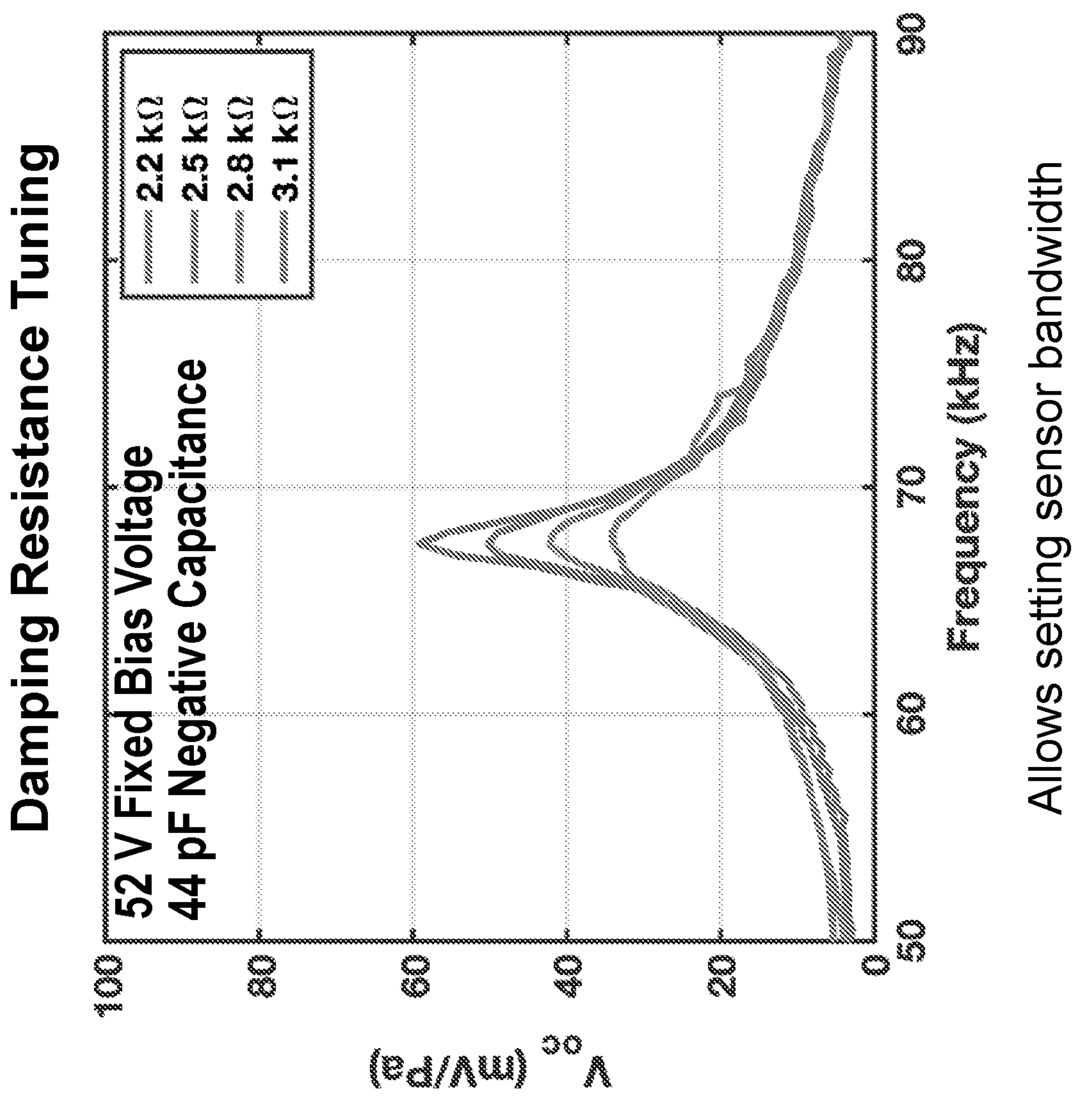

FIGS. 15A and 15B are graphs showing characteristics relating to the use of negative capacitance tuning (FIG. 15A) and use of damping resistance tuning (FIG. 15B) in connection with an exemplary transducer-based circuit, according to the present disclosure. One such example of an exemplary transducer-based circuit in this regard is FIG. 2 (or generally as in FIG. 9). In the negative capacitance tuning measurements of FIG. 15A and as shown along the vertical axis, the negative capacitance is changed from 0 pF to 58 pF initially at increments of 20 pF and then at various smaller increments of between two and four until the last increment from 57 pF to 58 pF. For each such increment, as shown in the horizontal axis, resonance frequency is changed in an almost linear manner from about 62 KHz to about 83 KHz. For this experiment, the bias voltage at the front end of the circuit was fixed at 52V and with no damping resistance.

In FIG. 15B, bandwidth measurements are taken based on tuning of the damping resistance, with no changes in negative capacitance which was fixed at 44 pF and with the bias voltage at the front end of the circuit also fixed at 52V. As shown along the vertical axis of FIG. 15B, by increasing amplitude of the damping resistance, the output signal (e.g., generated by the operational amplified of FIG. 9) decreased with an expansion of the transducer bandwidth as sensed by the receiver circuit used for the measurements. More specifically, the damping resistance tuning changed in the following order: 2.2 kΩ, 2.5 kΩ, 2.8 kΩ, and 3.1 kΩ. For each such increment and as shown in the horizontal axis, the resonance frequency remained set at about 68 KHz.

Figure 16A:
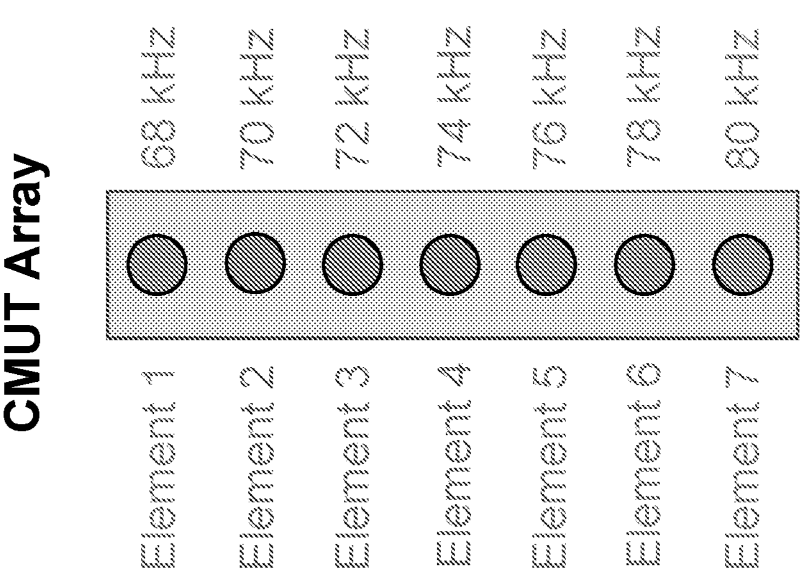
FIGS. 16A and 16B respectively show a type of transducer-based circuit array with negative-capacitance tuning and a corresponding performance graph, also according to various examples of the present disclosure.
Figure 16B:
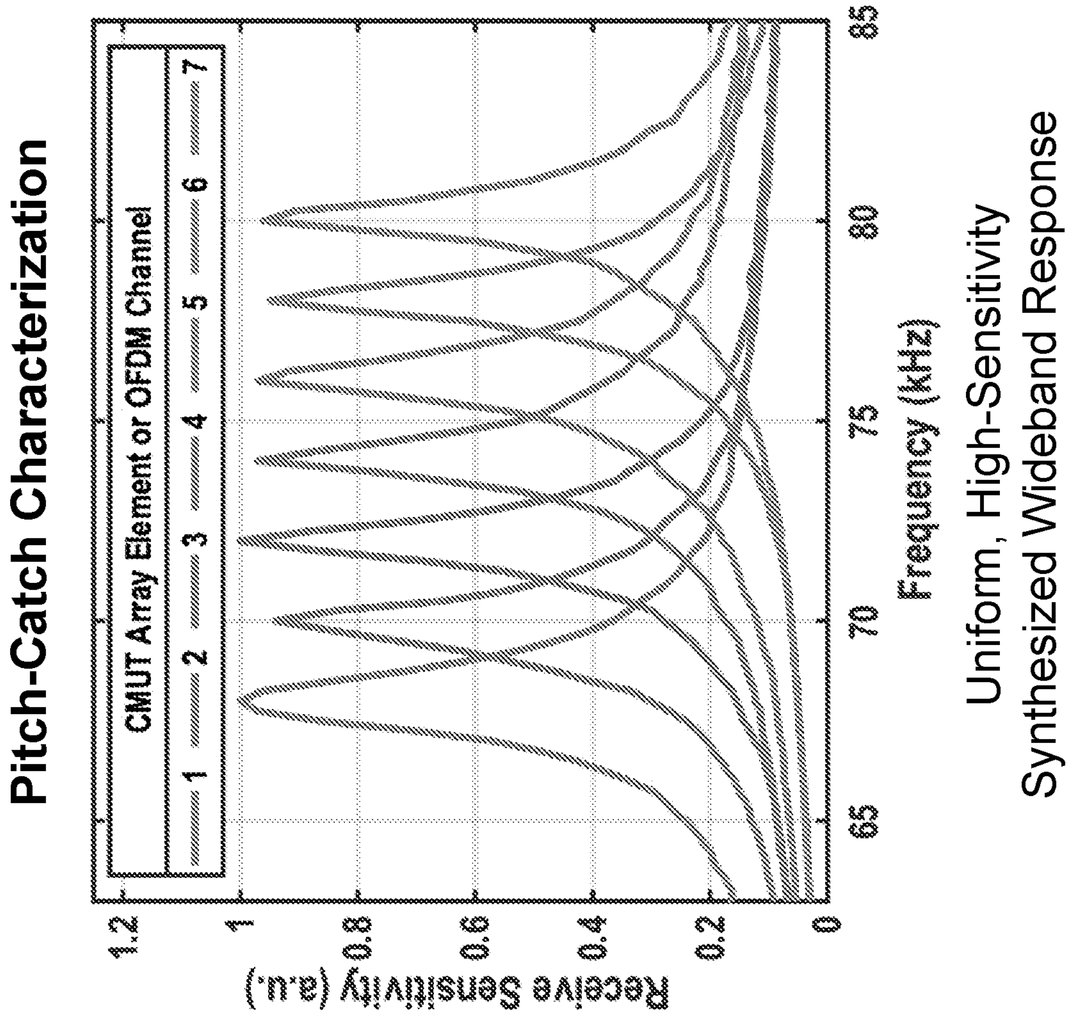

Also according to various examples of the present disclosure, FIGS. 16A and 16B respectively depict a CMUT (capacitive micromachined ultrasound transducer) type array (FIG. 16A) with negative capacitance tuning in a transducer-based circuit and a graph (FIG. 16B) showing characteristics relating to use of the transducer-based circuit. The transducer array includes one column of seven transducer elements, each with programmable circuitry (e.g., programmable negative capacitance) as discussed herein. In connection with this more-detailed example, related experimental testing has been conducted for multi-frequency operation across the transducer array. The frequencies in units of kHz are shown for the seven elements respectively and in order from the first element to the seventh element as follows: 68, 70, 72, 74, 76, 78 and 80, As shown in FIG. 16B, the receive sensitivity for each of elements is substantially constant (uniform) as expressed by each CMUT (array) element or a modulation channel (e.g., OFDM) driven by the corresponding CMUT element, thereby demonstrating (in a Pitch-Catch manner from corresponding CMUT elements to receiver), a synthesized wideband response that is both uniform and manifesting high sensitivity.

In one experimental/more-detailed example embodiment, to demonstrate a water-to-air US uplink (e.g., as discussed in connection with FIG. 32.4.5 of Appendix B of the U.S. Provisional identified herein), a QPSK-modulated OFDM scheme is used with a hydrophone in a water tank serving as the US transmitter and the CMUT receiver array and chip placed at a standoff in air. Each element in the array (e.g., 7 or 8 elements is configured to operate at a different orthogonal frequency by applying an optimal combination of bias voltage and negative capacitance, obtaining uniform sensitivity and bandwidth across the frequency range as seen in the pitch-catch measurement. The OFDM signal is transmitted with a pilot (as shown schematically in the table of said Appendix B). The data obtained across the CMUT elements may then be summed, equalized, and successfully demodulated achieving a 28 kb/s data rate with a BER of $3.3\times10^{-5}$ at 10 dB SNR.

As a preliminary tuning knob, the programmable bias voltage from the charge pump may be used to electronically tune the parallel resonance frequency, fp, of the CMUT. When tuning the bias voltage (e.g., 30 to 52V), CMUT impedance and pitch-catch measurements show a wide frequency range but have lower open-circuit sensitivities (Voc) at low bias voltages due to a loss in electro-mechanical conversion efficiency. To overcome this shortcoming, a second frequency tuning mechanism may be used to keep the CMUT biased at high voltage for efficient electro-mechanical conversion, while using the negative capacitance generated at the AFE input to tune the parallel resonance frequency. Unlike certain traditional equalization strategies that utilize negative capacitances, in addition to the parasitics, in this specific example, the sensor's active capacitance is canceled to generate large frequency shifts. By tuning the negative capacitance (e.g., 0 to 58 pF, 1 pF granularity) a higher impedance is obtained as more of the CMUT capacitance is canceled, providing higher sensitivities at higher frequencies albeit with lower quality factors (due to imperfect $R_{damp}$ compensation). These two tuning mechanisms can thus be used to provide a synthesized frequency range (e.g., >20× wider than the intrinsic CMUT bandwidth).

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects which may be modified and/or combined with the other disclosed devices and examples as described hereinabove may also be found in the Appendices of the above-referenced Provisional Application.

The skilled artisan would also recognize various terminology as used in the present disclosure by way of their plain meaning. As examples, the Specification may describe and/or illustrates aspects useful for implementing the examples by way of various semiconductor materials/circuits which may be illustrated as or using terms such as layers, blocks, modules, device, system, unit, controller (or control), and/or other circuit-type depictions. Such circuitry, circuit elements and/or related circuit components and/or circuit-based subsections may be used together with other elements to exemplify how certain examples may be carried out in the form or structures, steps, functions, operations, activities, etc.

Also and particularly in connection with discussion of circuitry (e.g., control or controller) characterizing logic use to provide control over the resonance frequency or bandwidth associated with the characterized transducers in the various examples of the present disclosure, in certain example embodiments using CPU-related logic (e.g., a programmable CPU circuit), aspects of the present disclosure are directed to memory circuitry (e.g., non-volatile memory device) for storing and accessing a program to be executed as a set (or sets) of instructions (and/or to be used as configuration data to define how the programmable circuit is to perform such control), and an algorithm or process as described herein is used by the programmable circuit to perform related steps, functions, operations, activities, etc.

Depending on the application, the instructions (and/or configuration data) can be configured for implementation in such logic circuitry, with the instructions (whether characterized in the form of object code, firmware or software) stored in and accessible from a memory (circuit) whereupon access of the instructions causes the programmable circuit or CPU-related logic to carry out the related steps, functions, operations, activities.

It would also be appreciated that terms to exemplify orientation, such as above/below, may be used herein to refer to relative positions of elements as shown in the figures. It should be understood that the terminology is used for notational convenience only and that in actual use the disclosed structures may be oriented different from the orientation shown in the figures.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. An apparatus comprising:

a transducer to be operated with negative capacitance and via at least one resonance frequency of the transducer within a normalized-sensitivity range for operating the transducer; and tunable circuitry including a tunable negative capacitance control to change, while maintaining sensitivity provided by the transducer within the normalized- sensitivity range, one or more of said at least one resonance frequency and programmable damping resistance control to change a frequency bandwidth around said at least one the resonance frequency.

2. The apparatus of claim 1, wherein the tunable circuitry is part of an air-coupled and immersion-based acoustic transducer having an intrinsic transducer bandwidth, and the tunable negative capacitance control is to change the tunable negative capacitance in order to provide a synthesized frequency range wider than, by more than an order of magnitude. the intrinsic transducer bandwidth.

3. The apparatus of claim 1, wherein the tunable negative capacitance control refers to or includes at least one of the following: a variable capacitor, a circuit to permit selection of one or more of a plurality of different capacitance circuits.

4. The apparatus of claim 1, further including an array of a plurality of transducer elements, wherein the transducer is one of among the array of a plurality of transducer elements.

5. The apparatus of claim 1, further including an array of transducer elements, wherein the transducer is one of among the array of transducer elements, and each of the transducer elements is biased towards its optimal bias voltage.

6. The apparatus of claim 1, further including control circuitry and an array of a plurality of transducer elements, wherein the transducer is one of among the array of transducer elements, and the control circuitry is to independently set the frequency response of at least two different ones of the transducer elements in the array.

7. The apparatus of claim 1, further including an array of transducer elements, wherein the transducer is one of among the array of transducer elements, and at least two different ones of the transducer elements in the array is configured so that it may be selected or controlled independently to provide at least one selectable characteristic associated with one or more of the transducer elements, the at least one selectable characteristic being from among: a certain frequency, and a bandwidth.

8. The apparatus of claim 1, wherein the tunable circuitry is to effect the change as a change in bandwidth around said at least one resonance frequency.

9. The apparatus of claim 1, wherein the tunable circuitry is to effect the change as a change in said at least one resonance frequency.

10. The apparatus of claim 1, wherein the transducer has an optimal bias voltage and the transducer is biased towards the optimal bias voltage.

11. The apparatus of claim 1, wherein the tunable circuitry includes the tunable negative capacitance control interfacing with the transducer, and the transducer is biased towards an optimal bias voltage of the transducer.

12. The apparatus of claim 1, wherein the tunable circuitry is to mitigate or cancel parasitic capacitance.

13. The apparatus of claim 1, further including a control circuit to control an input of the tunable circuitry for changing one or more of said at least one resonance frequency and the frequency bandwidth around said at least one the resonance frequency.

14. The apparatus of claim 1, further comprising:

tunable negative capacitance as part of a feedback path around the operational amplifier.

15. The apparatus of claim 14, wherein at least one of the tunable negative capacitance control and the programmable damping resistance control is to drive one or more inputs of the operational amplifier.

16. The apparatus of claim 15, further including a stability detection loop, coupled to the tunable negative capacitance control, for automatically providing a maximum allowable negative level of capacitance.

17. The apparatus of claim 15, further including a resonance frequency estimation circuit, coupled to the tunable negative capacitance control, for automatically providing a setting to the tunable negative capacitance control.

18. The apparatus of claim 14, wherein the tunable circuitry includes:

a resonance frequency and bandwidth estimation circuit, coupled to the tunable negative capacitance, for automatically providing a setting to the tunable negative capacitance and a setting to the programmable damping resistance control.

19. A method comprising:

operating a transducer, coupled to a tunable negative capacitance, at a resonance frequency of the transducer within a normalized-sensitivity range; and changing or setting, while maintaining sensitivity provided by the transducer within the normalized-sensitivity range, a characteristic concerning the resonance frequency by using a tunable circuit to effect a change of the resonance frequency or a bandwidth around the resonance frequency and, via a programmable damping resistance control, a change of a frequency bandwidth around the resonance frequency.

20. The method of claim 19, further including: controlling an input of the tunable negative capacitance to change a bandwidth at the resonance frequency of the transducer; and wherein using a tunable circuit includes effecting a change of the resonance frequency and a change of the bandwidth around the resonance frequency, wherein the tunable circuit includes a programmable variable negative capacitance control to effect a change of the resonance frequency and further includes a programmable damping resistance to change the bandwidth around the resonance frequency.

* * * * *